(12) United States Patent
Okazaki et al.

(10) Patent No.: US 7,367,245 B2
(45) Date of Patent: May 6, 2008

(54) JOINT STRUCTURE AND ROBOT ARM

(75) Inventors: Yasunao Okazaki, Shiga (JP); Katsuhiko Asai, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/785,366

(22) Filed: Apr. 17, 2007

(65) Prior Publication Data

US 2007/0199399 A1    Aug. 30, 2007

Related U.S. Application Data

(63) Continuation of application No. PCT/JP2005/021239, filed on Nov. 18, 2005.

(30) Foreign Application Priority Data

Nov. 22, 2004    (JP) ............................. 2004-337067

(51) Int. Cl.
    *B25J 17/00*    (2006.01)
(52) U.S. Cl. ............................ 74/490.04; 74/490.05; 74/490.06; 901/21; 901/28
(58) Field of Classification Search ............. 74/490.01, 74/490.04, 490.05, 490.06; 901/21, 27, 28
    See application file for complete search history.

(56) References Cited

U.S. PATENT DOCUMENTS

| | | | | |
|---|---|---|---|---|
| 5,046,375 A | * | 9/1991 | Salisbury et al. .......... 74/89.22 |
| 5,778,730 A | * | 7/1998 | Solomon et al. .......... 74/490.04 |
| 6,077,027 A | * | 6/2000 | Kawamura et al. ........ 414/744.5 |
| 2004/0250644 A1 | * | 12/2004 | Gosselin et al. .......... 74/490.04 |
| 2005/0053453 A1 | * | 3/2005 | Wilson ....................... 414/729 |
| 2007/0193398 A1 | * | 8/2007 | Kawabuchi et al. .......... 74/530 |
| 2007/0256513 A1 | * | 11/2007 | Forslund et al. .......... 74/490.06 |

FOREIGN PATENT DOCUMENTS

| | | |
|---|---|---|
| JP | 61-249292 | 11/1986 |
| JP | 3-26476 | 2/1991 |
| JP | 6-77914 | 10/1994 |
| JP | 3290709 | 6/2002 |
| JP | 2004-306224 | 11/2004 |
| JP | 2005-46980 | 2/2005 |

* cited by examiner

*Primary Examiner*—David M. Fenstermacher
(74) *Attorney, Agent, or Firm*—Wenderoth, Lind & Ponack, L.L.P.

(57) ABSTRACT

A joint structure includes a rotating guide pulley, a fixed guide, and a rotating guide pulley. The rotating guide pulley is coaxial with a rotating shaft of a revolute joint, and is arranged so as to be rotatable about the rotating shaft. The fixed guide is arranged in a first structure, and has an arc portion. The arc portion has the same radius as the rotating guide pulley and is coaxial with the rotating guide pulley. The rotating guide pulley is arranged in a second structure so as to be relatively movable. A wire is put round the rotating guide pulley, the movable rotating guide pulley, and the fixed guide in the order of them.

14 Claims, 21 Drawing Sheets

JOINT STRUCTURE AND ROBOT ARM

This is a continuation application of International Application No. PCT/JP2005/021239, filed Nov. 18, 2005.

BACKGROUND OF THE INVENTION

The present invention relates to a joint structure which can be applied to a joint mechanism of a mechanical apparatus such as a robot arm, and the robot arm including the joint structure.

Conventionally, in a structure of a multiple-joint robot arm, an actuator which drives a joint is usually arranged in a joint portion or near the joint portion. However, in such a structure, hand inertia becomes large, because a heavy motor or the like is arranged near a hand such as a wrist of a human-like arm. This may hinder an improvement of hand position control performance, or may generate a large impact in collision, which requires a consideration in terms of safety.

In response to the above issue, a wire drive type robot arm has been developed, in which the actuator is arranged near a base end position away from the driven joint and driving force is transmitted by wire. Because the hand can be slimmed down in the wire drive type robot arm, the wire drive type robot arm has excellent characteristics such as high-speed drive.

However, in the wire drive type robot arm, in the case where the wrist portion is driven by arranging the actuator in a body portion which is of a base portion to which the arm is attached in order to reduce the hand-side inertia, namely, in the case where a run distance of the wire is made longer, it is necessary that the wire be arranged beyond the joint such as an elbow of the human-like arm. In this case, when driving the joint located in the midway of the wire, a wire path length changes, which causes an issue that the change in wire path length influences on joint movement of the end portion, such as the wrist, which is driven by the wire.

In order to solve the issue, Patent Document 1 (Japanese Patent No. 3290709) discloses a configuration in which a pair of pulleys is arranged so as to be displaced from a rotation center of the joint. Further, Patent Document 2 (Japanese Examined Patent Publication No. H6-77914) discloses a configuration having a wire guide pulley the rotation center is rotated in accordance with the joint movement.

However, in the configuration disclosed in the Patent Document 1, the change in wire path length by the joint movement cannot completely be eliminated, so that the change in wire path length is increased as a rotation angle of the joint located in the midway is increased. Further, in the configuration disclosed in the Patent Document 2, when the rotational movement of the wire guide pulley is generated in accordance with the joint rotation, in the state where the joint is bent, the wire path is bent toward a direction opposite to the direction of a front end-side arm member before the wire is bent toward the direction of the front end-side arm member. Therefore, the wire path cannot be kept completely constant irrespective of the joint movement.

An object of the present invention is to provide, in order to solve the above issues, a joint structure which can transmit driving force without being influenced by rotating movement at the revolute joint at all, and the robot arm including the joint structure.

SUMMARY OF THE INVENTION

In order to achieve the above object, the present invention is configured as follows.

According to a first aspect of the present invention, there is provided a joint structure comprising:

a first structure;

a second structure;

a revolute joint for connecting the first structure and the second structure;

a rotating guide pulley which is coaxial with a rotating shaft of the revolute joint and arranged so as to be rotatable about the rotating shaft;

a fixed guide which is arranged in the first structure, the fixed guide having an arc portion;

a movable rotating guide pulley which is arranged in the second structure so as to be relatively movable;

a wire which is put round the rotating guide pulley, the movable rotating guide pulley, and the fixed guide in an order of the rotating guide pulley, the movable rotating guide pulley, and the fixed guide;

a first drive apparatus, which is included in the first structure, for rotating the second structure about the revolute joint without changing a distance from the movable rotating guide pulley to the rotating guide pulley; and a second drive apparatus, which is included in the first structure, for driving the wire, and moving the movable rotating guide pulley to change the distance to the rotating guide pulley by driving the wire, wherein the second structure is rotated about the revolute joint by driving the first drive apparatus without changing the distance from the movable rotating guide pulley to the rotating guide pulley.

According to the present invention, the driving force of the second drive apparatus (for example, translation actuator) arranged in the first structure can be transmitted to an end portion (for example, hand) such as a wrist beyond the revolute joint without being influenced by rotating movement at the revolute joint.

Accordingly, the second drive apparatus such as the actuator which drives the movement of the wrist or the like of the robot arm can be arranged on a bottom side of the robot arm, and inertia on a front end of the robot arm is decreased, so that high-speed operation can be performed while control performance is improved with respect to positional control and force control. Because the inertia is small, kinetic energy also becomes small and safety in collision may be improved.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
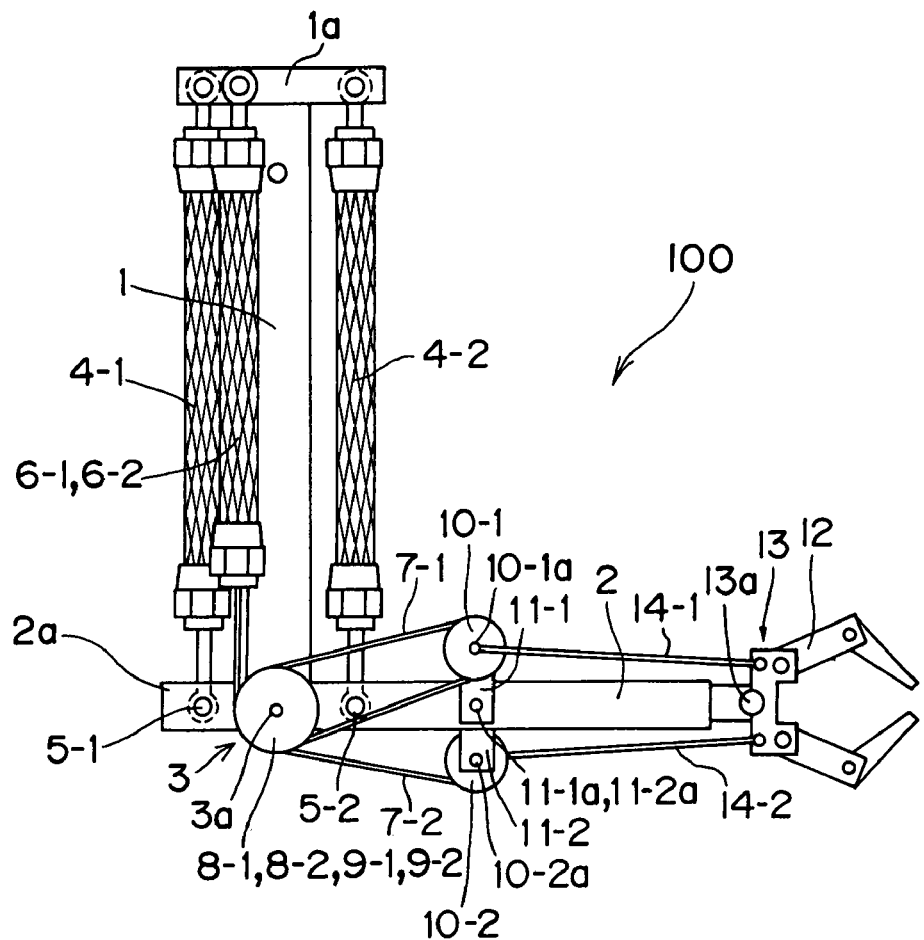
FIG. 1A is a plan view showing an almost entirety of a robot arm in a case where a joint structure according to a first embodiment of the present invention is applied to the robot arm.

Before the description of the present invention proceeds, it is to be noted that like parts are designated by like reference numerals throughout the accompanying drawings.

Various aspects of the present invention will be described before preferred embodiments of the present invention are described in detail with reference to the drawings.

According to a first aspect of the present invention, there is provided a joint structure comprising:

a first structure;

a second structure;

a revolute joint for connecting the first structure and the second structure;

a rotating guide pulley which is coaxial with a rotating shaft of the revolute joint and arranged so as to be rotatable about the rotating shaft;

a fixed guide which is arranged in the first structure, the fixed guide having an arc portion;

a movable rotating guide pulley which is arranged in the second structure so as to be relatively movable;

a wire which is put round the rotating guide pulley, the movable rotating guide pulley, and the fixed guide in an order of the rotating guide pulley, the movable rotating guide pulley, and the fixed guide;

a first drive apparatus, which is included in the first structure, for rotating the second structure about the revolute joint without changing a distance from the movable rotating guide pulley to the rotating guide pulley; and a second drive apparatus, which is included in the first structure, for driving the wire, and moving the movable rotating guide pulley to change the distance to the rotating guide pulley by driving the wire, wherein the second structure is rotated about the revolute joint by driving the first drive apparatus without changing the distance from the movable rotating guide pulley to the rotating guide pulley.

According to a second aspect of the present invention, there is provided a joint structure according to the first aspect, wherein the fixed guide is formed as a part of a member fixed to the first structure.

According to a third aspect of the present invention, there is provided a joint structure according to the first aspect, wherein the movable rotating guide pulley has a structure in which a first movable rotating guide pulley whose guide groove is located in a same plane as a plane including a guide groove of the rotating guide pulley and a second movable rotating guide pulley whose guide groove is located in a same plane as a plane including a guide groove of the fixed guide are integrally formed.

According to a fourth aspect of the present invention, there is provided a joint structure according to the first aspect, wherein the movable rotating guide pulley has a first guide groove located in a same plane as a plane including a guide groove of the rotating guide pulley and a second guide groove located in a same plane as a plane including a guide groove of the fixed guide.

According to a fifth aspect of the present invention, there is provided a joint structure comprising:

a first structure;

a second structure;

a revolute joint for connecting the first structure and the second structure;

a first rotating guide pulley and a second rotating guide pulley which are coaxial with a rotating shaft of the revolute joint, the first rotating guide pulley and the second rotating guide pulley being arranged in the first structure or the second structure so as to be rotatable about the rotating shaft respectively, the first rotating guide pulley and the second rotating guide pulley being capable of rotating relative to each other;

a movable rotating guide pulley which is arranged in the second structure so as to be relatively movable;

an auxiliary rotating guide pulley which is provided in the first structure while freely rotated;

a wire which is put round the first rotating guide pulley, the movable rotating guide pulley, the second rotating guide pulley, and the auxiliary rotating guide pulley in an order of the first rotating guide pulley, the movable rotating guide pulley, the second rotating guide pulley, and the auxiliary rotating guide pulley, both end portions of the wire being fixed to the second drive apparatus;

a first drive apparatus, which is included in the first structure, for rotating the second structure about the revolute joint without changing a distance from the movable rotating guide pulley to the first and second rotating guide pulleys; and a second drive apparatus, which is included in the first structure, for driving the wire, and moving the movable rotating guide pulley to change the distance to the first and second rotating guide pulleys by driving the wire, wherein the second structure is rotated about the revolute joint by driving the first drive apparatus without changing the distance from the movable rotating guide pulley to the first and second rotating guide pulleys.

According to a sixth aspect of the present invention, there is provided a joint structure comprising:

a first structure;

a second structure;

a revolute joint for connecting the first structure and the second structure;

a third rotating guide pulley which is coaxial with a rotating shaft of the revolute joint, and arranged so as to be rotatable about the rotating shaft;

a fourth rotating guide pulley which is arranged in the second structure while freely rotated;

a movable rotating guide pulley which is arranged in the second structure so as to be relatively movable;

a first drive apparatus, which is included in the first structure, for rotating the second structure about the revolute joint without changing a distance from the movable rotating guide pulley to the rotating guide pulley; and a second drive apparatus, which is included in the first structure, for driving a wire, and moving the movable rotating guide pulley to change the distance to the rotating guide pulley by driving the wire; and the wire which is put round the third rotating guide pulley, the movable rotating guide pulley, and the fourth rotating guide pulley in an order of the third rotating guide pulley, the movable rotating guide pulley, and the fourth rotating guide pulley, one end portion of the wire being fixed to the second drive apparatus, the other end portion being fixed to the fourth rotating guide pulley;

a first parallel link whose one end portion is supported by the first structure while freely rotated; and a second parallel link in which one end portion is connected to the other end portion of the first parallel link so as to be freely rotated and the other end portion is fixed to the fourth rotating guide pulley, wherein a four-node parallel link structure is formed so as to have four fulcrums of a portion where the one end portion of the first parallel link is supported to the first structure, a portion where the other end portion of the first parallel link and the one end portion of the second parallel link are connected to each other, a portion where the other end portion of the second parallel link is fixed to the fourth rotating guide pulley, and a portion which is arranged in the second structure of the fourth rotating guide pulley while freely rotated, and the second structure is rotated about the revolute joint by driving the first drive apparatus without changing the distance from the movable rotating guide pulley to the third rotating guide pulley.

According to a seventh aspect of the present invention, there is provided a joint structure comprising:

a first structure;

a second structure;

a rotating guide pulley which is coaxial with a rotating shaft of the revolute joint, and arranged so as to be rotatable about the rotating shaft;

a movable rotating guide pulley which is arranged in the second structure so as to be relatively movable;

a first drive apparatus which is included in the first structure, for rotating the second structure about the revolute joint without changing a distance from the movable rotating guide pulley to the rotating guide pulley;

a second drive apparatus which is included in the first structure, for driving a wire, and moving the movable rotating guide pulley to change the distance to the rotating guide pulley by driving the wire;

the wire which is put round the rotating guide pulley and the movable rotating guide pulley in an order of the rotating guide pulley and the movable rotating guide pulley, one end portion of the wire being fixed to the second drive apparatus, the other end portion being fixed to the movable rotating guide pulley;

a first parallel link whose one end portion is supported by the first structure while freely rotated; and a second parallel link in which one end portion is connected to the other end portion of the first parallel link while being freely slidable and rotatable and the other end portion is fixed to the movable rotating guide pulley, wherein a four-node parallel link structure is formed while having four fulcrums of a portion where the one end portion of the first parallel link is supported to the first structure, a portion where the other end portion of the first parallel link and the one end portion of the second parallel link are connected to each other, a portion where the other end portion of the second parallel link is fixed to the movable rotating guide pulley, and a portion which is arranged in the second structure of the rotating guide pulley while freely rotated, and the second structure is rotated about the revolute joint by driving the first drive apparatus without changing the distance from the movable rotating guide pulley to the rotating guide pulley.

According to an eighth aspect of the present invention, there is provided a robot arm comprising:

a joint structure as in any one of the first to seventh aspects;

a hand which is arranged at an front end on a side opposite to a revolute joint side of the second structure; and a hand driving wire for connecting the movable rotating guide pulley and the hand, wherein the movable rotating guide pulley is movable relative to the second structure, and thereby the hand driving wire rotates and drives the hand with respect to the second structure.

The embodiments of the present invention will be described in detail below with reference to the drawings.

First Embodiment

Figure 1B:
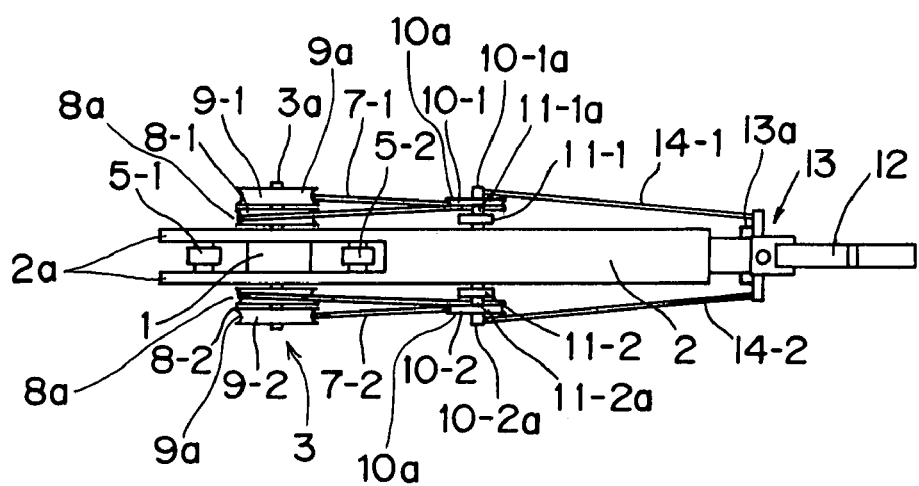
FIG. 1B is a bottom view showing the almost entirety of the robot arm in the case where the joint structure according to the first embodiment of the present invention is applied to the robot arm.

FIGS. 1A and 1B are overall views showing a joint structure according to a first embodiment of the present invention. FIGS. 1A and 1B show, by way of example, a structure of a case in which the joint structure of the first embodiment is applied to a robot arm 100.

In FIGS. 1A and 1B, numeral 1 designates a rod-shape first structure which forms an upper arm portion of the robot arm 100. Numeral 2 designates a rod-shape second structure which forms a front arm portion of the robot arm 100. The first structure 1 and the second structure 2 are connected to each other by a first revolute joint 3, and the first structure 1 and the second structure 2 can relatively forwardly and reversely be rotated about a joint shaft 3a of the first revolute joint 3. As an example shown in FIG. 1B, branch portions 2a into which a first revolute joint side-end portion of the second structure 2 is branched are formed, a lower end portion of the first structure 1 is sandwiched between the branch portions 2a, and the first structure 1 is connected so as to be relatively rotatable with respect to the joint shaft 3a.

Numerals 4-1 and 4-2 designate two first translation actuators, such as pneumatic artificial muscles, each capable of constituting a first translation actuator as an example of the first drive apparatus. Each of upper end portions of the two first translation actuators 4-1 and 4-2 is fixed to a support plate 1a fixed to the upper end portion of the first structure 1. Lower end portions of the two first translation actuators 4-1 and 4-2 are rotatably coupled to rotating ends of revolute joints 5-1 and 5-2 whose base end portions are fixed to the second structure 2, connecting the two first translation actuators 4-1 and 4-2 to the first structure 1 and the second structure 2 to drive the normal and reverse rotations of the first structure 1 and second structure 2 at the first revolute joint 3. That is, the base end portions of the rod-shape revolute joints 5-1 and 5-2 are fixed to the second structure 2, and the lower end portions of the first translation actuators 4-1 and 4-2 are rotatably coupled to the front end portion of the joints 5-1 and 5-2. Because the revolute joints 5-1 and 5-2 are symmetrically arranged in relation to the rotating shaft 3a of the first revolute joint 3, the second structure 2 is rotated clockwise about the rotating shaft 3a of the first revolute joint 3 when the lower end portion of the first translation actuator 4-1 is ascended while the lower end portion of the first translation actuator 4-2 is lowered. On the contrary, when the lower end portion of the first translation actuator 4-1 is lowered while the lower end portion of the first translation actuator 4-2 is ascended, the second structure 2 is rotated counterclockwise about the rotating shaft 3a of the first revolute joint 3.

Numerals 6-1 and 6-2 designate two second translation actuators, such as the pneumatic artificial muscles, motors, or cylinders, each capable of constituting a second translation actuator as an example of the second drive apparatus (the second translation actuators in FIG. 1A are shown overlapping each other, and the second translation actuator on the front side designates 6-1 and the second translation actuator on the rear side designates 6-2). The two second translation actuators 6-1 and 6-2 pull and drive arm flexure wires 7-1 and 7-2 whose end portions are fixed to lower ends of the second translation actuators 6-1 and 6-2.

Figure 3:
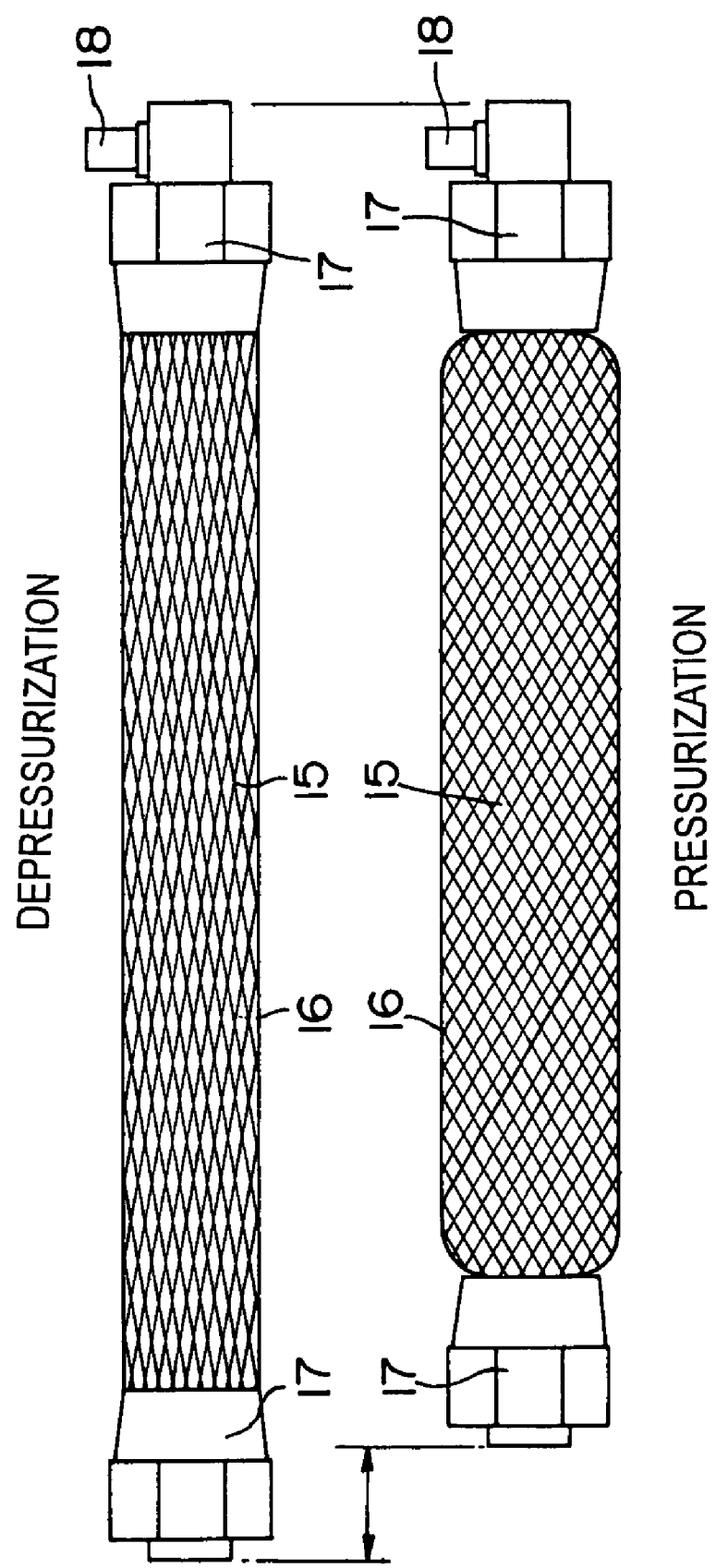
FIG. 3 is a view showing a structure of a pneumatic artificial muscle which can form a group of translation actuators as an example of a drive apparatus of the joint structure according to the first embodiment of the present invention.

In the structure of each of the pneumatic artificial muscles constituting the translation actuators 4-1, 4-2, 6-1, and 6-2, as shown in FIG. 3, a constraint member 16 formed by fiber cords is arranged on an outer surface of a tubular elastic body 15 made of a rubber material, and both end portions of the tubular elastic body 15 are hermetically sealed by sealing members 17. When internal pressure is imparted to an internal space of the tubular elastic body 15 by supplying compressible fluid such as air into the tubular elastic body 15 through a fluid injection and evacuation member 18 which is provided in the sealing member 17 located at one end portion of the tubular elastic body 15, although the tubular elastic body 15 expands mainly in a radial direction, the expansion is converted into movement in a center axis direction of the tubular elastic body 15 by an action of the constraint member 16, which contracts an overall length of the tubular elastic body 15. On the contrary, when the internal pressure is reduced in the internal space of the tubular elastic body 15 by evacuating the compressible fluid such as air from the tubular elastic body 15 through the fluid injection and evacuation member 18, although the tubular elastic body 15 contracts mainly in the radial direction, the contraction is converted into the movement in the center axis direction of the tubular elastic body 15 by the action of the constraint member 16, which stretches the overall length of the tubular elastic body 15. Because the pneumatic artificial muscle is mainly made of an elastic material, the pneumatic artificial muscle has flexibility and a characteristic that the pneumatic artificial muscle is a safe and light actuator.

Numerals 8-1 and 8-2 designate rotating guide pulleys each having a guide groove 8a. The rotating guide pulleys 8-1 and 8-2 are coaxial with the rotating shaft 3a of the first revolute joint 3 at positions where the rotating guide pulleys 8-1 and 8-2 face each other across the second structure 2, and the rotating guide pulleys 8-1 and 8-2 are arranged in the second structure 2 while being freely rotatable about the rotating shaft 3a through bearings or the like. That is, the rotating guide pulleys 8-1 and 8-2 can freely be rotated about the rotating shaft 3a with respect to the second structure 2. In FIG. 1A, the rear-side rotating guide pulley 8-2 is not shown because the rotating guide pulley 8-2 is hidden behind the front-side rotating guide pulley 8-1. However, the rotating guide pulley 8-2 is shown in FIG. 1B.

Numerals 9-1 and 9-2 designate fixed guide pulleys each having a guide groove 9a which are of an example of the fixed guide. The fixed guide pulleys 9-1 and 9-2 have the same radiuses as those of the rotating guide pulleys 8-1 and 8-2. At the positions where the fixed guide pulleys 9-1 and 9-2 face each other across the second structure 2, the fixed guide pulleys 9-1 and 9-2 are arranged outside the rotating guide pulleys 8-1 and 8-2 respectively so as to be coaxial with the rotating shaft 3a of the first revolute joint 3. Because the fixed guide pulleys 9-1 and 9-2 are fixed to the first structure 1 with the rotating shaft 3a, the relative rotational movement is not generated between the fixed guide pulleys 9-1 and 9-2 and the first structure 1. In FIG. 1A, the rear-side fixed guide pulley 9-2 is not shown because the fixed guide pulley 9-2 is hidden behind the front-side fixed guide pulley 9-1. However, the fixed guide pulley 9-2 is shown in FIG. 1B. The rotating shaft 3a is fixed to the second structure 2.

Numerals 10-1 and 10-2 designate movable rotating pulleys each having a guide groove 10a which are arranged in an intermediate portion of the second structure 2. The movable rotating pulley 10-1 and 10-2 are arranged in an upper end portion of a lever 11-1 and a lower end portion of a lever 11-2, and the movable rotating pulley 10-1 and 10-2 can be rotated about rotating axes 10-1a and 10-2a respectively. The upper end portion of the lever 11-1 and the lower end portion of the lever 11-2 are arranged at respective positions so as to face each other across the second structure 2, and the upper end portion of the lever 11-1 and the lower end portion of the lever 11-2 can be swung about fulcrums 11-1a and 11-2a.

Numeral 12 designates a hand for holding goods and the like. The hand 12 is connected to the second structure 2 with a second revolute joint 13, and the hand 12 can relatively be swung about the joint shaft 13a with respect to the second structure 2.

Numerals 14-1 and 14-2 designate wires for driving the hand 12. In the hand drive wires 14-1 and 14-2, each of end portions are fixed to each of the rotating shafts 10-1a and 10-2a of the movable rotating pulleys 10-1 and 10-2, and the other end portions are fixed to positions which are symmetrically located in relation to the joint shaft 13a of the hand 12.

Figure 2:
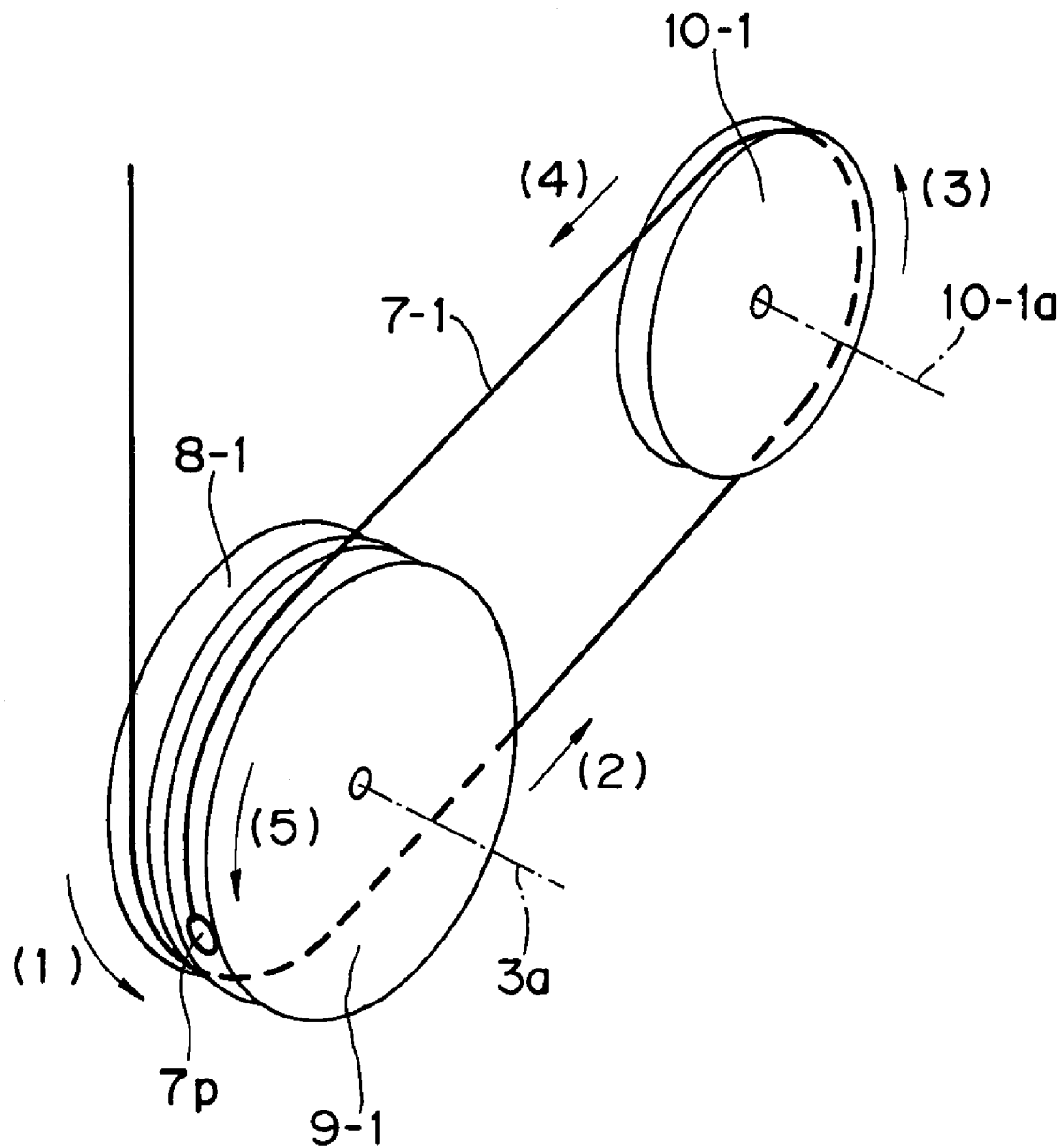
FIG. 2 is a perspective view showing a detailed structure of the joint structure according to the first embodiment of the present invention.

A path of the arm flexure wire 7-1 with respect to the rotating guide pulley 8-1, the fixed guide pulley 9-1, and the movable rotating pulley 10-1 will be described below with reference to FIG. 2. Although the wire is put round each pulley for the purpose of accommodating the wire in each guide groove (see FIG. 1B), the description of the guide groove will be omitted in the following description.

The arm flexure wire 7-1 whose one end is fixed to the lower end of the second translation actuator 6-1 is guided to the rotating guide pulley 8-1, and the path of the arm flexure wire 7-1 is bent by the rotating guide pulley 8-1 (see arrow (1)). Then, the arm flexure wire 7-1 is guided to the movable rotating pulley 10-1, under the movable rotating pulley 10-1 from under the joint shaft 3a of the first revolute joint 3 in the drawing sheet surface of FIG. 2 (see arrow (2)). Then, the arm flexure wire 7-1 is bent so as to turn the direction by the movable rotating pulley 10-1 (see arrow (3)), and the arm flexure wire 7-1 is guided to the upper side of the fixed guide pulley 9-1 from the upper side of the movable rotating pulley 10-1 in the drawing sheet surface of FIG. 2 (see arrow (4)). After the arm flexure wire 7-1 runs along an outer periphery of the fixed guide pulley 9-1 (see arrow (5)), the end portion of the arm flexure wire 7-1 is fixed to the fixed guide pulley 9-1 with a wire fixing pin 7P.

The path of the arm flexure wire 7-2 with respect to the rotating guide pulley 8-2, the fixed guide pulley 9-2, and the movable rotating pulley 10-2 is similar to the path of the arm flexure wire 7-1, so that the detailed description will be omitted.

Figure 4:
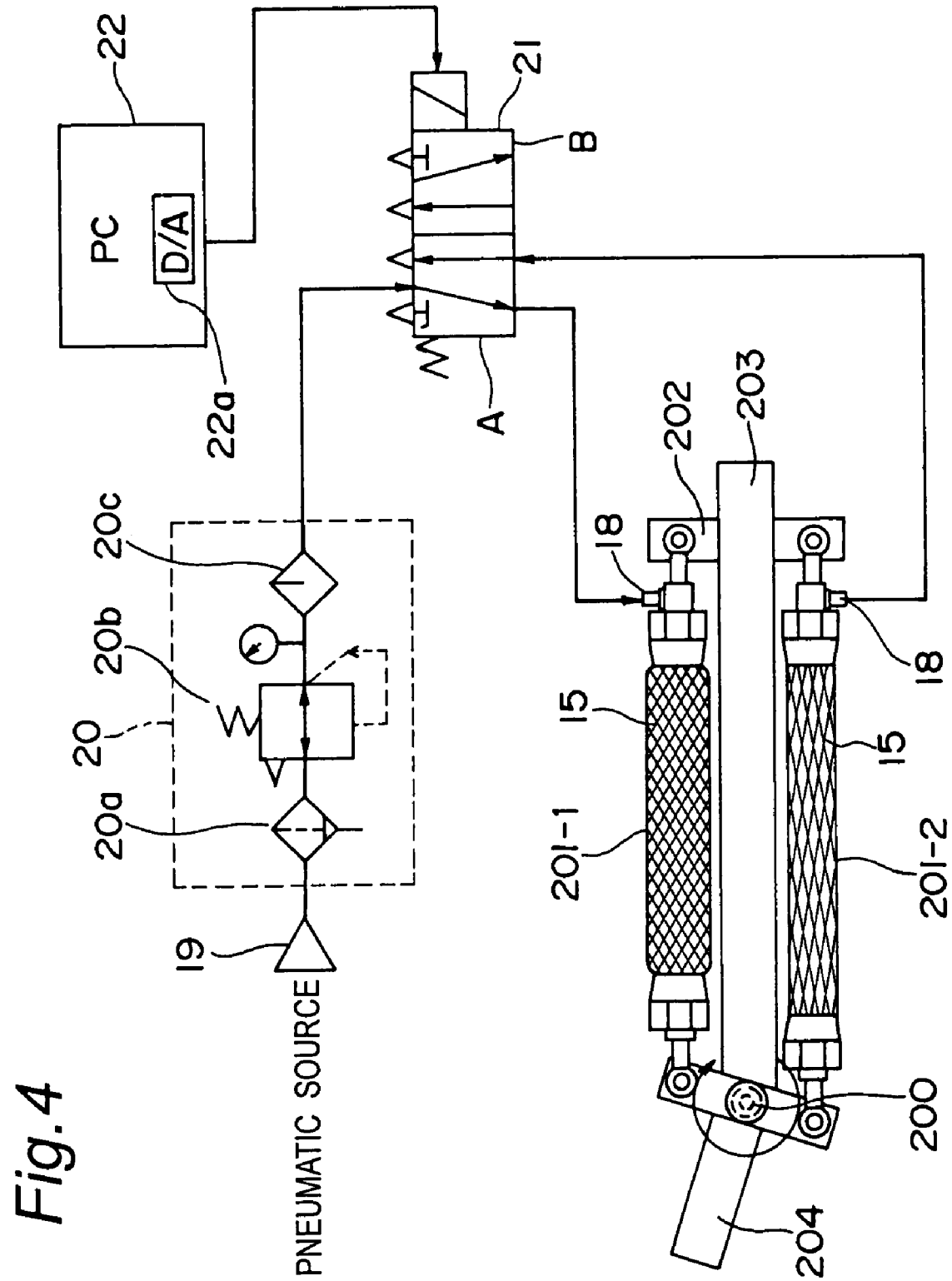
FIG. 4 is a view showing a configuration of a pneumatic supply and drive system for drives the pneumatic artificial muscle.

FIG. 4 is a view showing a configuration of a pneumatic supply and drive system for driving the pneumatic artificial muscle. In FIG. 4, numeral 19 designates a pneumatic source, for example, such as a compressor, and numeral 20 designates a pneumatic adjustment unit formed by a set of a pneumatic filter 20a, a pneumatic reducing valve 20b, and a pneumatic lubricator 20c. Numeral 21 designates a five-port flow rate control electromagnetic valve for controlling a flow rate by driving, e.g., a spool valve or the like using force of an electro magnet. Numeral 22 designates a control computer which is formed by, e.g., a general personal computer, and a D/A board 22a is mounted on the control computer 22. The flow rate of the air passing through each of the fluid injection and evacuation members 18 can be controlled by outputting a voltage instruction value to the five-port flow rate control electromagnetic valve 21.

According to the pneumatic supply and drive system shown in FIG. 4, the high-pressure air generated by the pneumatic source 19 is reduced and adjusted to, for example, a constant pressure of 600 kPa by the pneumatic adjustment unit 20, and the air is supplied to the five-port flow rate control electromagnetic valve 23. A valve opening degree of the five-port flow rate control electromagnetic valve 21 is controlled in proportion to the voltage instruction value outputted from the control computer 22 through the D/A board 22a. The fluid injection and evacuation members 18 of the tubular elastic bodies 15 of a pair of pneumatic artificial muscles 201-1 and 201-2 are connected to the five-port flow rate control electromagnetic valve 21. The pair of pneumatic artificial muscles 201-1 and 201-2 is arranged in substantially parallel with a support rod 203, and the end portions on the fluid injection and evacuation members-18-side of the tubular elastic bodies 15 are fixed to a support plate 202 fixed to the end portion of the support rod 203. A T-shaped rotating member 204 is supported on the other end portion side of each of the tubular elastic bodies 15 of the pair of pneumatic artificial muscles 201-1 and 201-2. The rotating member 204 is rotatably supported at the revolute joint shaft 200 by the support rod 203, and the other end portions of the respective tubular elastic bodies 15 of the pair of pneumatic artificial muscles 201-1 and 201-2 are rotatably supported by the rotating member 204. Accordingly, as described below, the rotating member 204 is rotated forwardly and reversely about the revolute joint shaft 200 by stretching and contracting the tubular elastic bodies 15 of the pair of pneumatic artificial muscles 201-1 and 201-2.

In the case where the control computer 22 causes the D/A board 22a to input the positive voltage instruction value to the five-port flow rate control electromagnetic valve 21, a pneumatic circuit becomes the state shown by the sign A in FIG. 4, a flow channel is opened from the pneumatic source-19-side to the fluid injection and evacuation member-18-side of the tubular elastic body 15 of the pneumatic artificial muscle 201-1 through the five-port flow rate control electromagnetic valve 21, and the air is supplied to the pneumatic artificial muscle-201-1-side at the flow rate proportional to an absolute value of the voltage instruction value. On the pneumatic artificial muscle 201-2-side, a flow channel is opened to an atmospheric air side from the fluid injection and evacuation member 18 of the tubular elastic body 15 through the five-port flow rate control electromagnetic valve 21, and the air is evacuated into the atmosphere from pneumatic artificial muscle 201-2-side at the flow rate proportional to the absolute value of the voltage instruction value. Accordingly, as shown in FIG. 4, the overall length of the pneumatic artificial muscle 201-1 is contracted while the overall length of the pneumatic artificial muscle 201-2 is stretched, which allows the joint shaft 200 to perform the clockwise rotational movement at a speed proportional to the absolute value of the voltage instruction value as shown by an arrow in FIG. 4.

On the other hand, in the case where the control computer 22 causes the D/A board 22a to input the negative voltage instruction value to the five-port flow rate control electromagnetic valve 21, the pneumatic circuit becomes the state shown by the sign B in FIG. 4 by switching the five-port flow rate control electromagnetic valve 21, the pneumatic artificial muscle 201-2 is reversely operated, and the joint shaft 200 perform the counterclockwise rotational movement. That is, the flow channel is opened from the pneumatic source-19-side to the fluid injection and evacuation member-18-side of the tubular elastic body 15 of the pneumatic artificial muscle 201-2 through the five-port flow rate control electromagnetic valve 21, and the air is supplied to the pneumatic artificial muscle 201-2-side at the flow rate proportional to the absolute value of the voltage instruction value. On the side of the pneumatic artificial muscle 201-1, the flow channel is opened to the atmospheric air side from the fluid injection and evacuation members 18 of the tubular elastic body 15 through the five-port flow rate control electromagnetic valve 21, and the air is evacuated into the atmosphere from the side of pneumatic artificial muscle 201-1 at the flow rate proportional to the absolute value of the voltage instruction value. Accordingly, the overall length of the pneumatic artificial muscle 201-2 is contracted while the overall length of the pneumatic artificial muscle 201-1 is stretched, which allows the joint shaft 200 to perform the counterclockwise rotational movement shown by the reverse direction of the arrow in FIG. 4 at a speed proportional to the absolute value of the voltage instruction value.

An operation of the joint structure having the wire guidance mechanism of the above-described configuration will be described below.

Figure 5A:
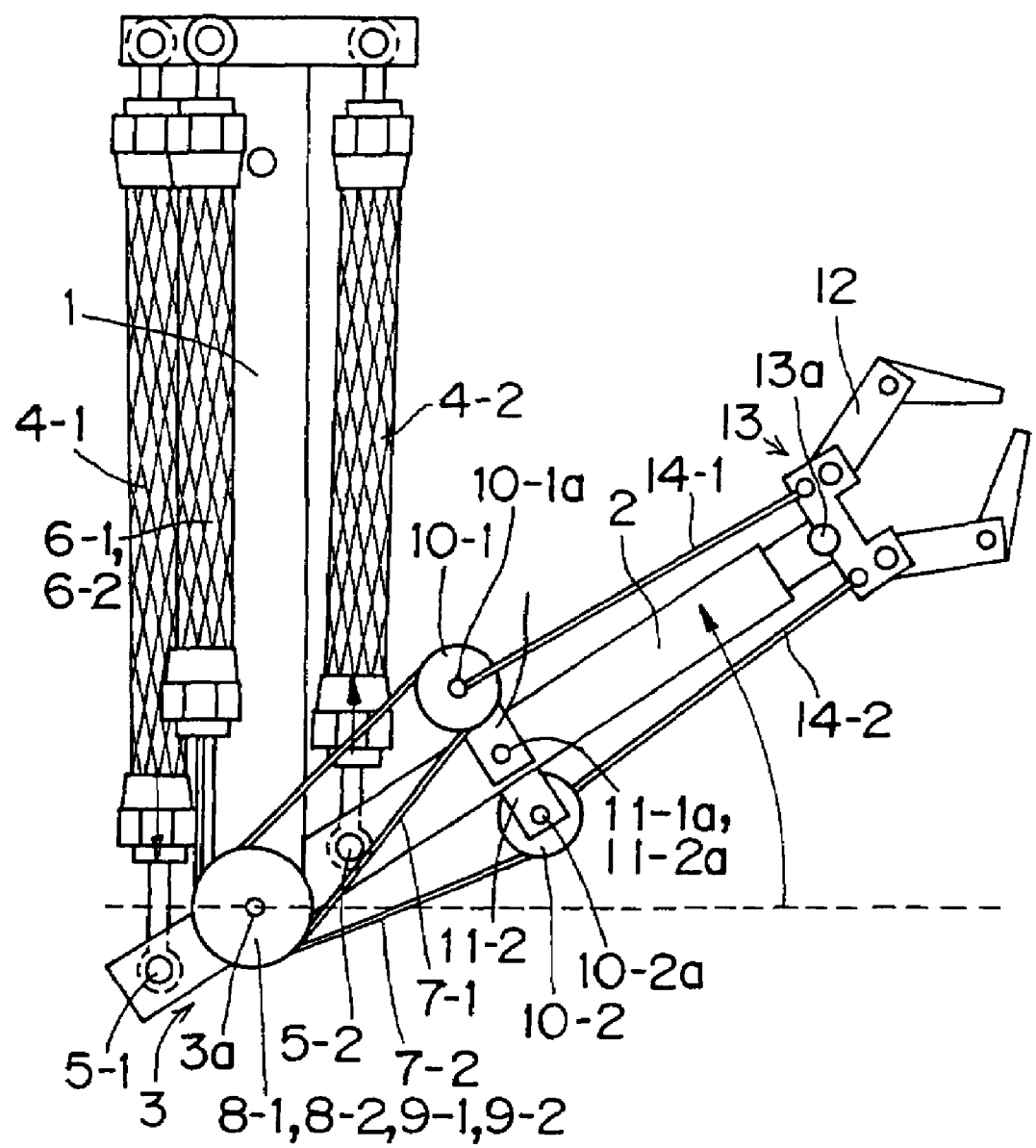
FIG. 5A is a side view showing an operation of a robot arm in the case where the joint structure according to the first embodiment of the present invention is applied to the robot arm.
Figure 5B:
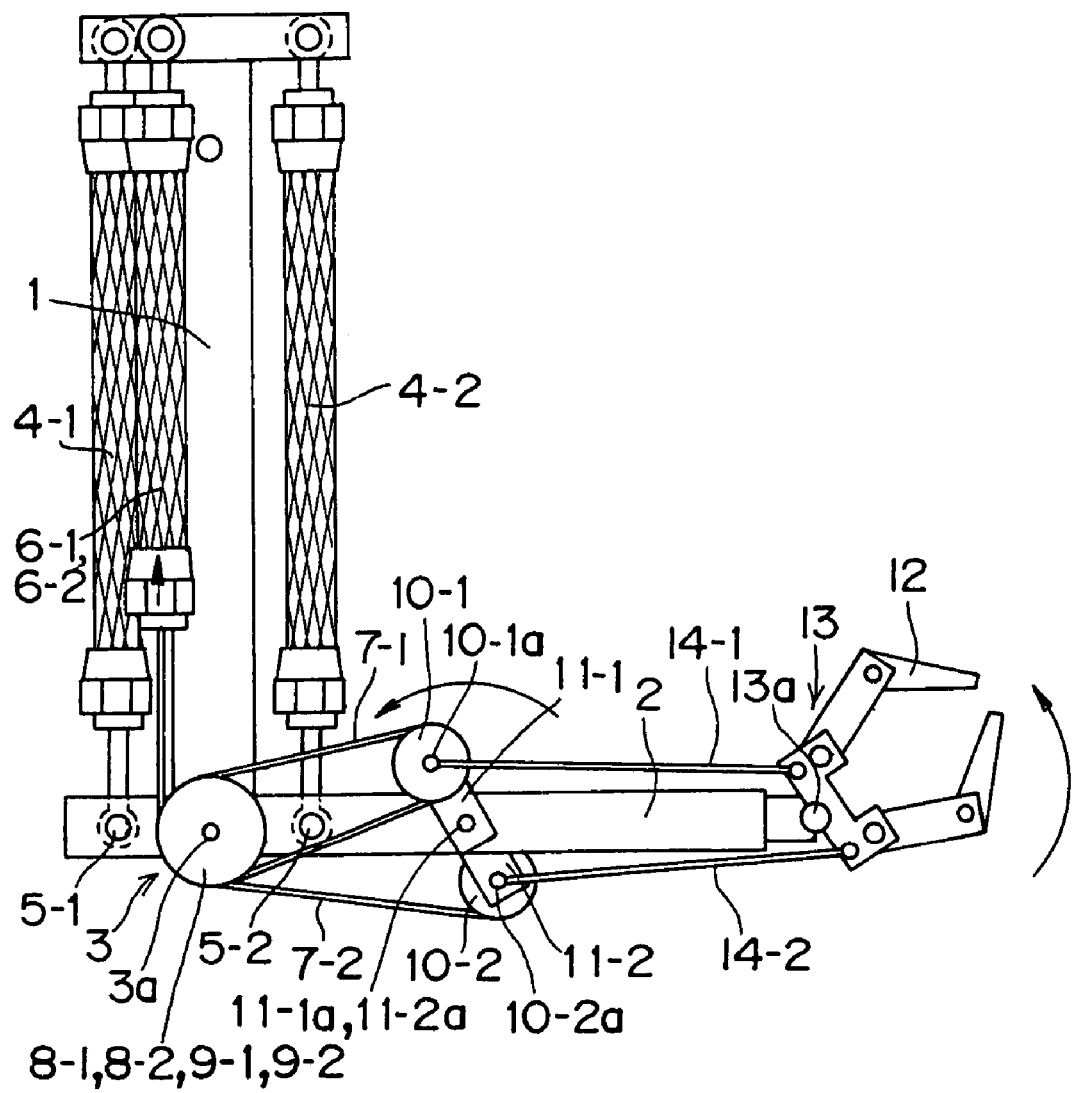
FIG. 5B is a side view showing the robot arm operation in the case where the joint structure according to the first embodiment of the present invention is applied to the robot arm.

FIGS. 5A and 5B are views showing the robot arm operation in the case where the joint structure according to the first embodiment of the present invention is applied to the robot arm.

As described above, in the two first translation actuators 4-1 and 4-2 of the first translation actuator 4, the first translation actuator 4-1 located on the left side of FIG. 1A and the first translation actuator 4-2 located on the right side of FIG. 1A are connected to the second structure 2 through the revolute joints 5-1 and 5-2 so as to face each other across the first structure 1 with respect to the first revolute joint 3. Accordingly, when the first translation actuator 4-1 located on the left side of FIG. 1A is stretched while the first translation actuator 4-2 located on the right side of FIG. 1A is contracted, as shown in FIG. 5A, the counterclockwise rotational movement is generated about the rotating shaft 3a of the first revolute joint 3. On the contrary, when the first translation actuator 4-1 located on the left side of FIG. 1A is contracted while the first translation actuator 4-2 located on the right side of FIG. 1A is stretched, the clockwise rotational movement is generated about the rotating shaft 3a of the first revolute joint 3.

At this point, the first embodiment of the present invention has a feature in that the arm flexure wires 7-1 and 7-2 are induced by the rotating guide pulleys 8-1 and 8-2, the fixed guide pulleys 9-1 and 9-2, and the movable rotating pulleys 10-1 and 10-2. The action will be described below with reference to FIGS. 6A and 6B.

Figure 6A:
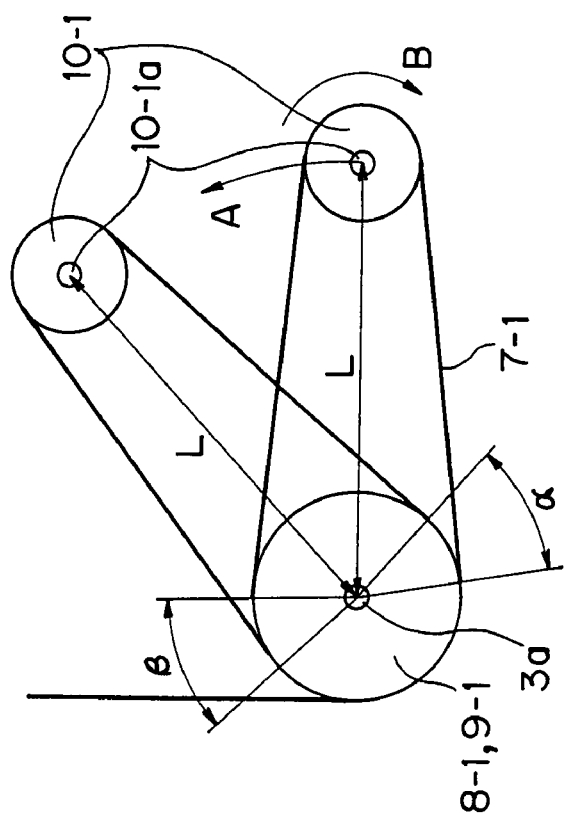
FIG. 6A is a view showing a wire guidance operation of the joint structure according to the first embodiment of the present invention in operating a first translation actuator.

In the case where the counterclockwise rotational movement of the second structure 2 is generated about the rotating shaft 3a of the first revolute joint 3 by the operations of the first translation actuators 4-1 and 4-2 as shown in FIG. 5A, the relatively rotational movement of the movable rotating pulley 10-1 relative to the rotating guide pulley 8-1 and the fixed guide pulley 9-1 is generated about the rotating shaft 3a of the first revolute joint 3 as shown by an arrow A of FIG. 6A. At this point, an amount in which the arm flexure wire 7-1 is put round the circumferential portion of the rotating guide pulley 8-1 is increased by a part of a circumference corresponding to an angle α and decreased by a part of the circumference corresponding to an angle β. The arm flexure wire 7-1 is induced by the clockwise rotational movement about the rotating shaft 10-1a of the movable rotating pulley 10-1 as shown by an arrow B, and the increase which is of the part of the circumference corresponding to the angle α and the decrease which is of the part of the circumference corresponding to the angle β cancel each other. A distance L between the rotating guide pulley 8-1 and the movable rotating pulley 10-1 is not changed because of angle α=angle β. Accordingly, the relatively rotational movement relative to the second structure 2 is not generated about the fulcrum 11-1a of the lever 11-1.

The same wire guidance operation is performed in the guidance of the arm flexure wire 7-2 by the rotating guide pulley 8-2, the fixed guide pulley 9-2, and the movable rotating pulley 10-2.

Accordingly, the relatively rotational movement of the hand 12, connected to the levers 11-1 and 11-2, about the second revolute joint 13 relative to the second structure 2 by a hand driving wire 14-1 and a hand driving wire 14-2 is not generated by the rotational movement about the rotating shaft 3a of the first revolute joint 3 of the second structure 2 by the operation of the first translation actuator 4.

Figure 6B:
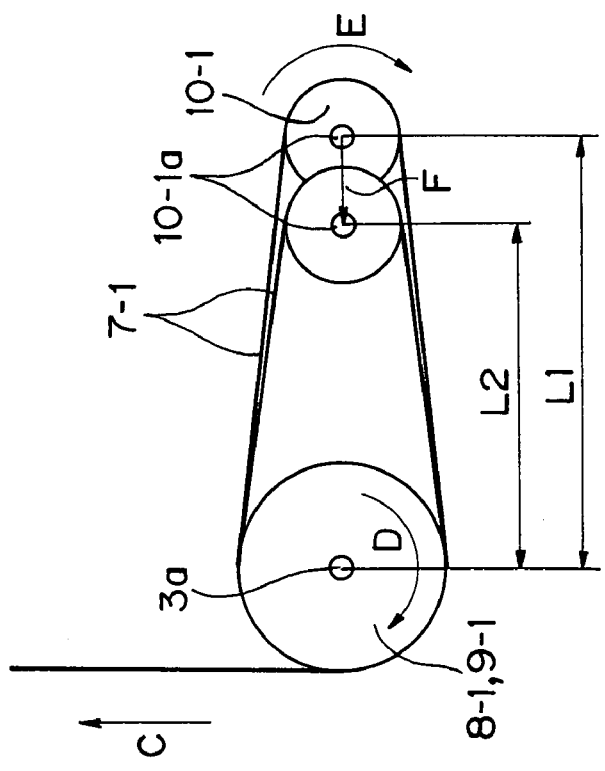
FIG. 6B is a view showing the wire guidance operation of the joint structure according to the first embodiment of the present invention in operating a second translation actuator.

On the other hand, in the case where the second translation actuator 6-1 is contracted while the second translation actuator 6-2 is stretched, the arm flexure wire 7-1 is pulled as shown by an arrow C of FIG. 6B, the rotating guide pulley 8-1 is rotated clockwise about the rotating shaft 3a of the first revolute joint 3 as shown by an arrow D, and the arm flexure wire 7-1 is delivered toward the second translation actuator 6-1-side. However, the arm flexure wire 7-1 is fixed to the fixed guide pulley 9-1 (see FIG. 2), the movable rotating pulley 10-1 is brought close to the rotating guide pulley 8-1 as shown by an arrow F while rotated clockwise about the rotating shaft 10-1a as shown by an arrow E, and the distance L between the rotating guide pulley 8-1 and the movable rotating pulley 10-1 is shortened, such that the distance is shortened from a distance L1 of pre-movement to a distance L2 (L1>L2). Accordingly, as shown in FIG. 5B, the lever 11-1 is relatively rotated counterclockwise about the fulcrum 11-1a relative to the second structure 2. On the contrary, the guidance of the arm flexure wire 7-2 by the rotating guide pulley 8-2, the fixed guide pulley 9-2, and the movable rotating pulley 10-2, as shown in FIG. 5B, the lever 11-2 is relatively rotated clockwise about the fulcrum 11-2a relative to the second structure 2.

Accordingly, as shown in FIG. 5B, the hand 12 connected to the levers 11-1 and 11-2 with the hand driving wire 14-1 and the hand driving wire 14-2 is relatively rotated counterclockwise about the second revolute joint 13 relative to the second structure 2.

Thus, according to the joint structure of the first embodiment of the present invention, the arm flexure wires 7-1 and 7-2 are configured to be induced by the rotating guide pulleys 8-1 and 8-2, the fixed guide pulleys 9-1 and 9-2, and the movable rotating pulleys 10-1 and 10-2, which allows the driving force of the second translation actuator 6 arranged in the first structure 1 to be transmitted to the front end-side of the robot arm 100 beyond the first revolute joint 3 without being influenced by rotating movement about the rotating shaft 3a of the first revolute joint 3.

Accordingly, the actuator which drives the movement about the second revolute joint 13 can be arranged on the base end side of the robot arm 100 like the second translation actuator 6, the front end-side inertia of the robot arm 100 becomes small, so that the high-speed operation can be performed while the control performance concerning the position control and force control is improved. Because the inertia becomes small, the kinetic energy is also small, and the safety in collision is improved.

In the first embodiment, as an example, the second structure 2 can be rotated clockwise and counterclockwise about the rotating shaft 3a from the orientation shown in FIG. 1A by about 60 degrees with respect to the first structure 1. The hand 12 can also be rotated clockwise and counterclockwise about the rotating shaft 3a from the orientation shown in FIG. 1A by about 60 degrees with respect to the first structure 2.

Second Embodiment

Figure 7:
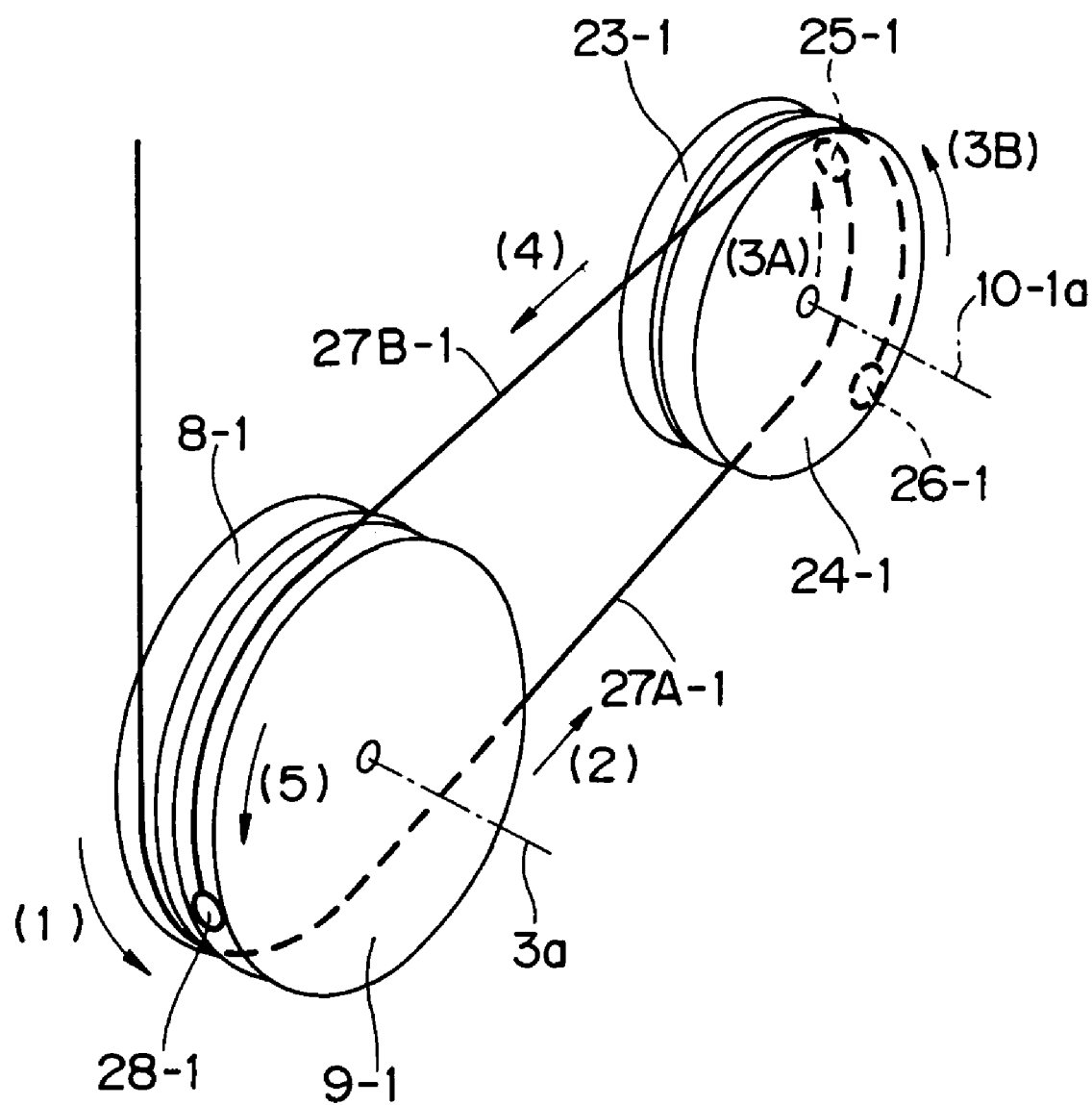
FIG. 7 is a perspective view showing a detailed structure of a joint structure according to a second embodiment of the present invention.

FIG. 7 is a perspective view showing a detailed structure of a joint structure according to a second embodiment of the present invention. In FIG. 7, only main components will be described, and other configurations will be omitted because other configurations are similar to those of the First embodiment shown in FIGS. 1A and 1B. Although the wire is put round each pulley so as to be accommodated in each guide groove (similarly to FIG. 1B), the guide groove will be omitted in the following description and the corresponding drawing for the purpose of simplification.

In FIG. 7, numeral 23-1 designates a first movable rotating guide pulley, and numeral 24-1 designates a second movable rotating guide pulley. The first movable rotating guide pulley 23-1 and the second movable rotating guide pulley 24-1 have the same radius. The first movable rotating guide pulley 23-1 and the second movable rotating guide pulley 24-1 are fixed to each other, and the first movable rotating guide pulley 23-1 and the second movable rotating guide pulley 24-1 are rotated about the rotating shaft 10-1a, and the first movable rotating guide pulley 23-1 and the second movable rotating guide pulley 24-1 are provided instead of the movable rotating pulley 10-1 of the first embodiment. The first movable rotating guide pulley 23-1 is arranged in the same plane as the rotating guide pulley 8-1, and the second movable rotating guide pulley 24-1 is arranged in the same plane as the fixed guide pulley 9-1.

Then, the wire path of the joint structure in the second embodiment will be described. In this case, the arm flexure wire 7-1 of the first embodiment is configured to be divided into a first arm flexure wire 27A-1 and a second arm flexure wire 27B-1. That is, after the first arm flexure wire 27A-1 is put round the rotating guide pulley 8-1 (see arrow (1)) to bend the direction (see arrow (2)), the first arm flexure wire 27A-1 is put round the first movable rotating guide pulley 23-1 (see arrow (3A)), and one end portion of the first arm flexure wire 27A-1 is fixed at a wire fixing point 25-1 on the circumference of the first movable rotating guide pulley 23-1.

One end portion of the second arm flexure wire 27B-1 is fixed at a wire fixing point 26-1 on the circumference of the second movable rotating guide pulley 24-1. After the second arm flexure wire 27B-1 is put round the second movable rotating guide pulley 24-1 (see arrow (3B)), the second arm flexure wire 27B-1 is induced to the fixed guide pulley 9-1-side (see arrow (4)), the second arm flexure wire 27B-1 is put round the fixed guide pulley 9-1 (see arrow (5)), and the other end portion of the second arm flexure wire 27B-1 is fixed to a wire fixing point of the fixed guide pulley 9-1.

The same configuration is formed at the position on the opposite side across the second structure 2 by a first movable rotating guide pulley 23-2, a second movable rotating guide pulley 24-2, a first arm flexure wire 27A-2, and a second arm flexure wire 27B-2, and the configuration is provided instead of the movable rotating pulley 10-2 of the first embodiment.

According to the joint structure of the second embodiment of the present invention described above, each of the paths of the first arm flexure wires 27A-1 and 27A-2 and the second arm flexure wires 27B-1 and 27B-2 is accommodated in one plane by arranging the first movable rotating guide pulleys 23-1 and 23-2 and the second movable rotating guide pulleys 24-1 and 24-2. Therefore, the point where the arm flexure wire is obliquely put round does not exist between the pulleys, so that a risk that the arm flexure wire drops out from the pulley can be decreased to operate the robot arm 100 more certainly.

Third Embodiment

Figure 8:
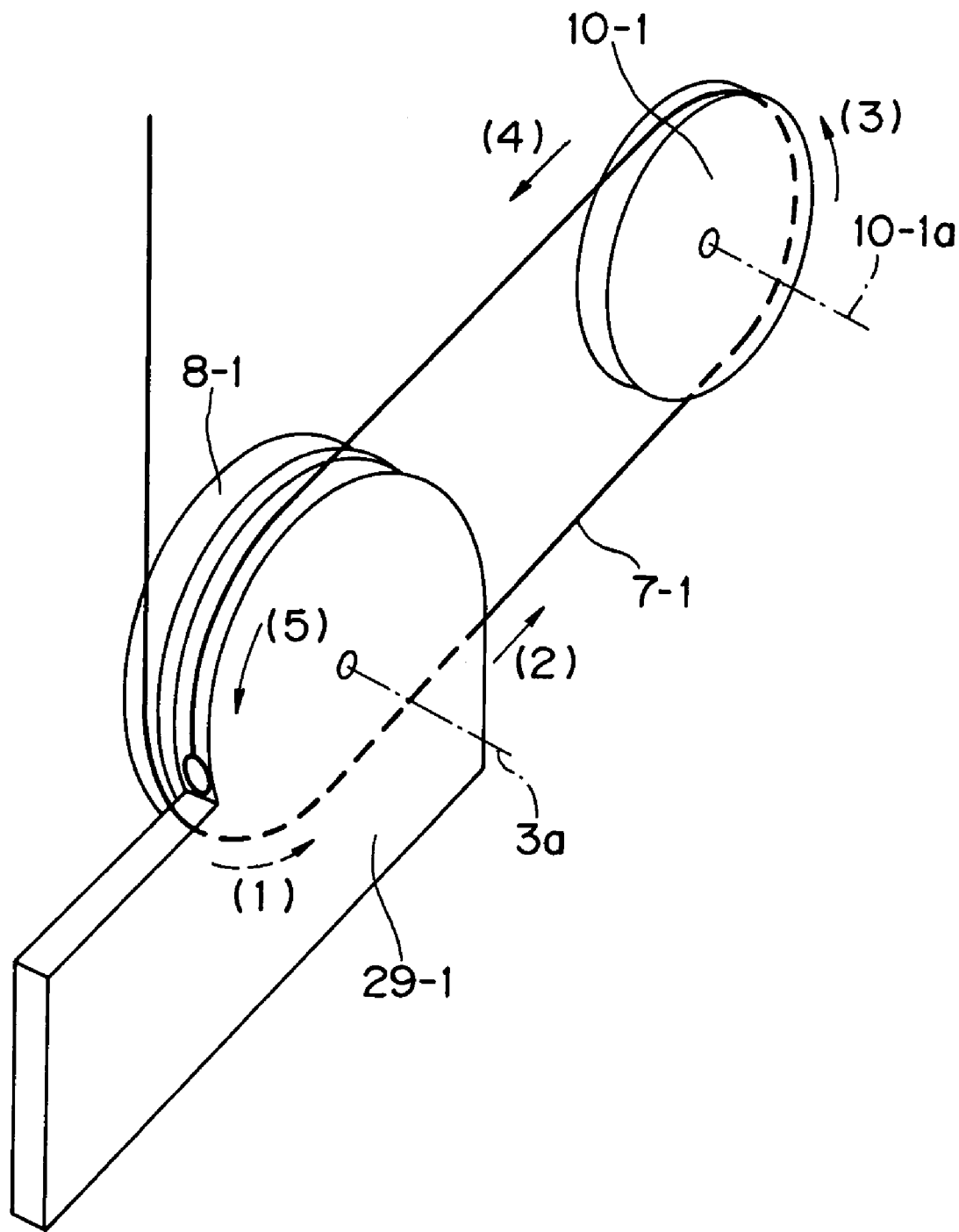
FIG. 8 is a perspective view showing a detailed structure of a joint structure according to a third embodiment of the present invention.

FIG. 8 is a perspective view showing a detailed structure of a joint structure according to a third embodiment of the present invention. In FIG. 8, only main components will be described, and other configurations will be omitted because other configurations are similar to those of the First embodiment shown in FIGS. 1A and 1B. Although the wire is put round each pulley so as to be accommodated in each guide groove (similarly to FIG. 1B), the guide groove will be omitted in the following description and the corresponding drawing for the purpose of simplification.

The joint structure of the third embodiment differs from the joint structure of the first embodiment in the configuration of a fixed guide 29-1. The fixed guide 29-1 is formed not in the disk shape like the fixed guide pulleys 9-1 and 9-2 of the joint structure in the first embodiment, but only a neighborhood of the portion with which the arm flexure wire 7-1 comes into contact is formed in an arc shape, and a groove for inducing the arm flexure wire 7-1 is formed. As shown in FIG. 2, the arm flexure wire 7-1 is similarly put round the arc portion of the fixed guide 29-1 in the order of the arrows (1) to (5).

According to the above configuration, the fixed guide 29-1 can be formed by forming a part of the first structure 1 or a part of another component fixed to the first structure 1 in the arc shape. Therefore, the dedicated component is not required due to the fixed guide 29-1, the number of components can be decreased, and miniaturization can be achieved.

Fourth Embodiment

Figure 9A:
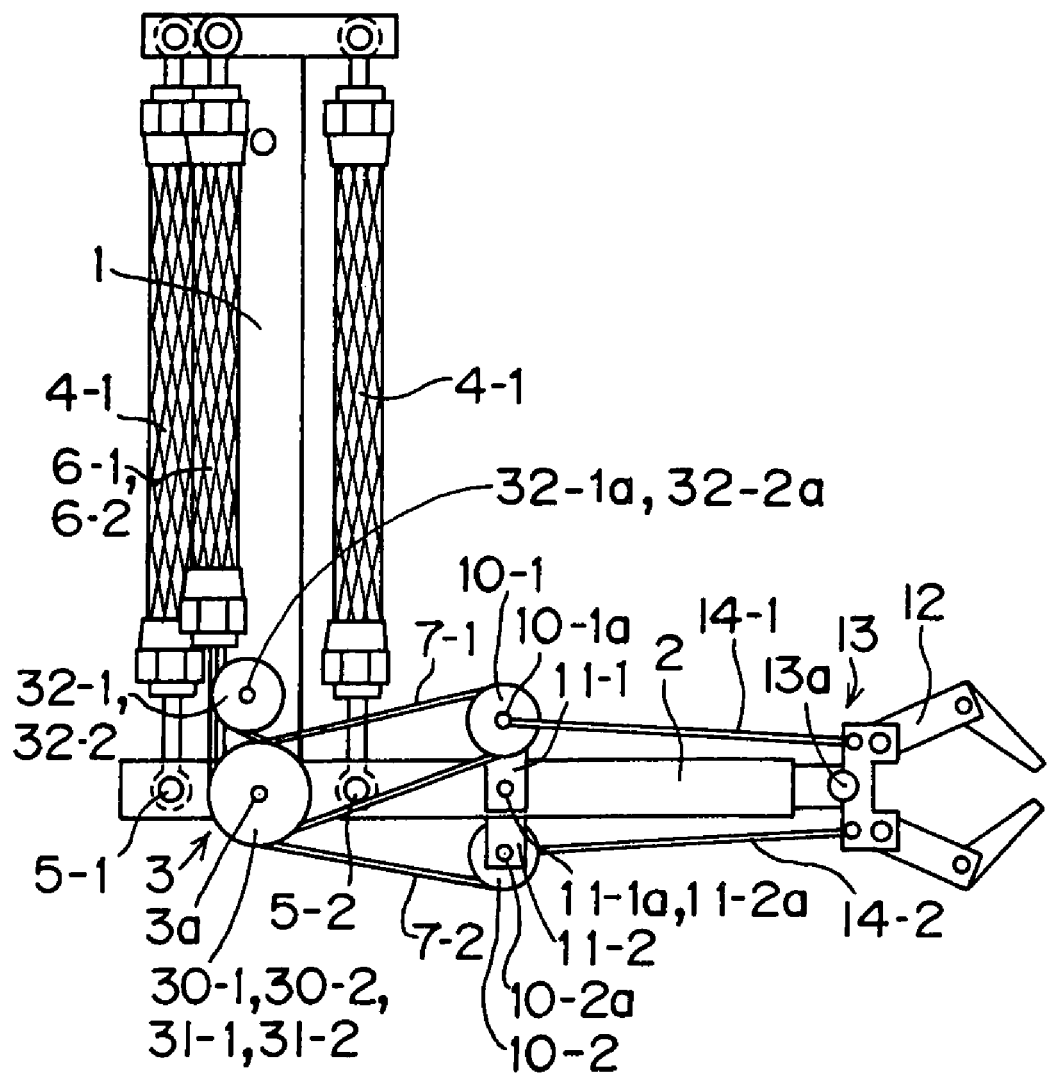
FIG. 9A is a side view showing an almost entirety of a robot arm in a case where a joint structure according to a fourth embodiment of the present invention is applied to the robot arm.
Figure 9B:
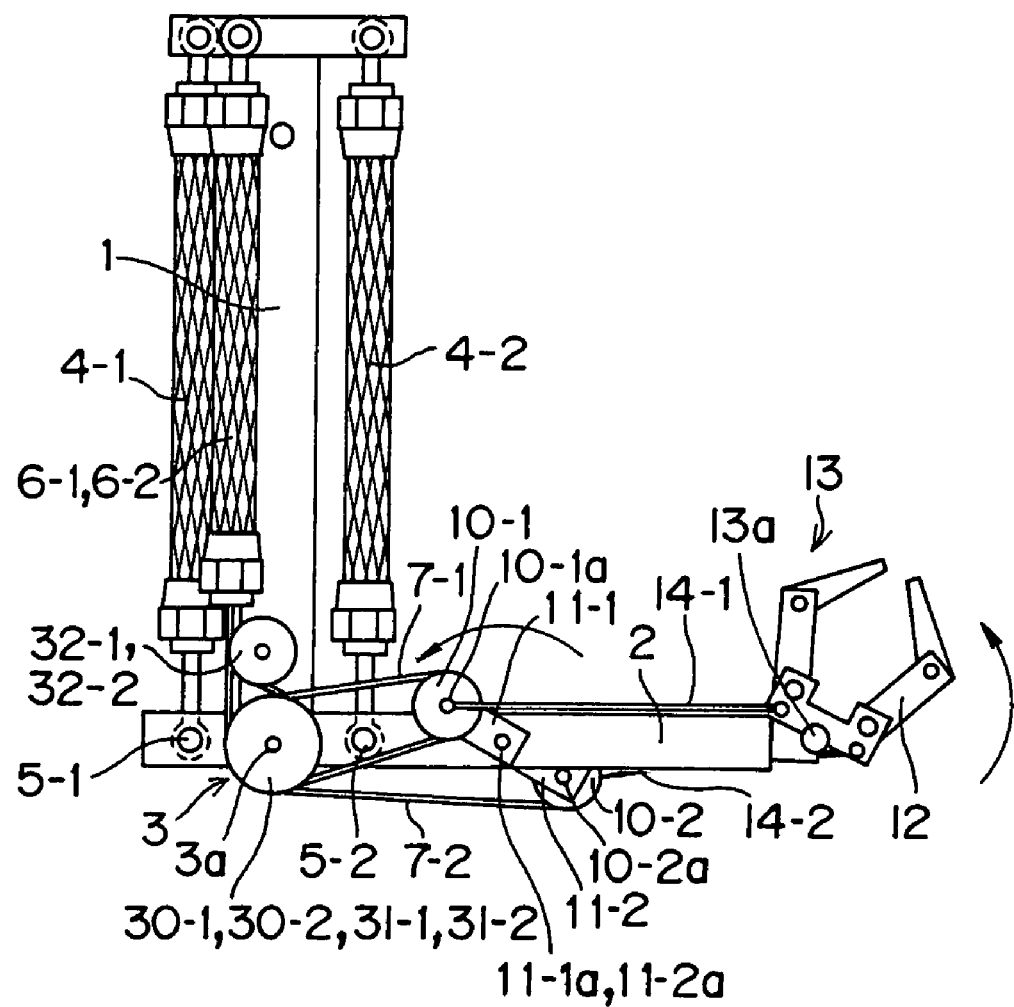
FIG. 9B is a side view showing the almost entirety of the robot arm in the case where the joint structure according to the fourth embodiment of the present invention is applied to the robot arm.

FIGS. 9A and 9B are overall views of a robot arm in the case where a joint structure according to a fourth embodiment of the present invention is applied to the robot arm.

In FIGS. 9A and 9B, numerals 30-1 and 30-2 designate first rotating guide pulleys. The first rotating guide pulleys 30-1 and 30-2 are coaxial with the rotating shaft 3a of the first revolute joint 3 at the positions where the first rotating guide pulleys 30-1 and 30-2 face each other across the second structure 2, and the first rotating guide pulleys 30-1 and 30-2 are arranged in the first structure 1 or second structure 2 while being freely rotatable about the rotating shaft 3a through bearings or the like. In FIGS. 9A and 9B, the rear-side first rotating guide pulley 30-2 is not shown because the first rotating guide pulley 30-2 is hidden behind the front-side first rotating guide pulley 30-1.

Numerals 31-1 and 31-2 designate second rotating guide pulleys. The second rotating guide pulleys 31-1 and 31-2 have the same radiuses as those of the first rotating guide pulleys 30-1 and 30-2. At the positions where the second rotating guide pulleys 31-1 and 31-2 face each other across the second structure 2, the second rotating guide pulleys 31-1 and 31-2 are rotatably arranged so as to be coaxial with the rotating shaft $3a$ of the first revolute joint 3 and the rotating shaft of the first rotating guide pulleys 30-1 and 30-2, the second rotating guide pulleys 31-1 and 31-2 can be rotated about the rotating shaft $3a$ through the bearings or the like, and the second rotating guide pulleys 31-1 and 31-2 can freely and relatively be rotated with respect to the first rotating guide pulleys 30-1 and 30-2. In FIGS. 9A and 9B, the rear-side second rotating guide pulleys 31-1 and 31-2 are not shown because the second rotating guide pulleys 31-1 and 31-2 are hidden behind the front-side second rotating guide pulley 31-1.

Numeral 32-1 and 32-2 designate auxiliary rotating guide pulleys. The auxiliary rotating guide pulleys 32-1 and 32-2 are arranged in the first structure 1 while being freely rotatable to the rotating shafts $32-1a$ and $32-2a$ through the bearings or the like. The auxiliary rotating guide pulleys 32-1 and 32-2 are arranged at the positions where the auxiliary rotating guide pulleys 32-1 and 32-2 are arranged to face each other across the second structure 2 in the substantially intermediate portion between the lower ends of the second translation actuators 6-1 and 6-2 and the second rotating guide pulleys 31-1 and 31-2, and the auxiliary rotating guide pulleys 32-1 and 32-2 are arranged while being freely rotated with respect to the first structure 1. In FIGS. 9A and 9B, the rear-side auxiliary rotating guide pulley 32-2 is not shown because the auxiliary rotating guide pulley 32-2 is hidden behind the front-side auxiliary rotating guide pulley 32-1.

Figure 10:
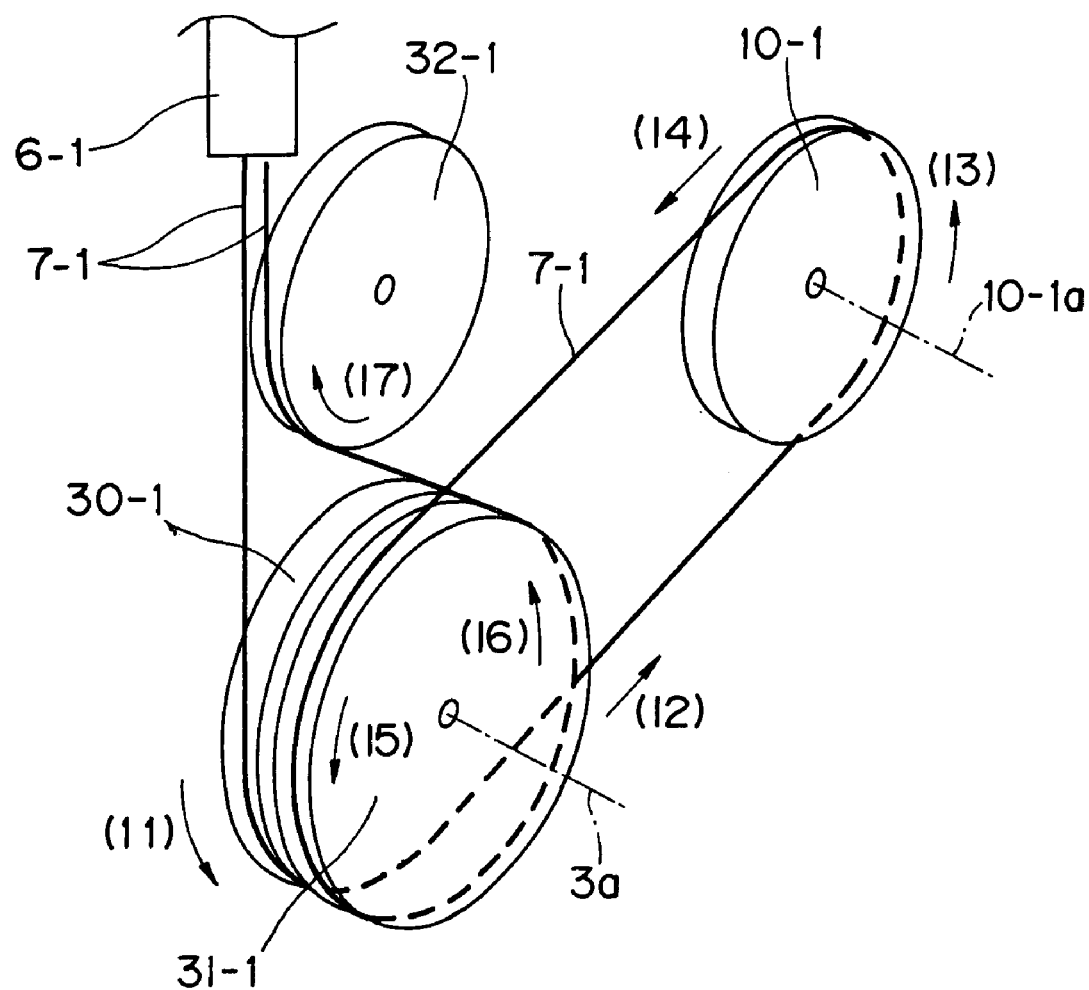
FIG. 10 is a perspective view showing a detailed structure of the joint structure according to the fourth embodiment of the present invention.

Then, the wire path of the joint structure in the fourth embodiment will be described with reference to FIG. 10. FIG. 10 is a perspective view showing the detailed structure of the joint structure according to the fourth embodiment of the present invention. Although the wire is put round each pulley so as to be accommodated in each guide groove (similarly to FIG. 1B), the guide groove will be omitted in the following description and the corresponding drawing for the purpose of simplification.

The arm flexure wire 7-1 whose one end portion is fixed to the lower end portion of the second translation actuator 6-1 is guided to the first rotating guide pulley 30-1, and the path of the arm flexure wire 7-1 is bent by the first rotating guide pulley 30-1 (see arrow (11)). Then, the arm flexure wire 7-1 is guided to the movable rotating pulley 10-1 from below the joint shaft $3a$ of the first revolute joint 3 in the drawing sheet surface of FIG. 10 (see arrow (12)). The arm flexure wire 7-1 is further guided to the lower side of the movable rotating pulley 10-1 in the drawing sheet surface of FIG. 10. Then, the arm flexure wire 7-1 is bent so as to turn the direction by the movable rotating pulley 10-1 (see arrow (13)), and the arm flexure wire 7-1 is guided from the upper side of the movable rotating pulley 10-1 to the upper side of the second rotating guide pulley 31-1 in the drawing sheet surface of FIG. 10 (see arrow (14)). Then, the arm flexure wire 7-1 substantially go around the outer circumference of the second rotating guide pulley 31-1 (see arrow (15)), and the arm flexure wire 7-1 is guided to the lower side from the upper side of the auxiliary rotating guide pulley 32-1 in the drawing sheet surface of FIG. 10 (see arrow (16)). The arm flexure wire 7-1 guided by the auxiliary rotating guide pulley 32-1 runs along the outer circumference of the auxiliary rotating guide pulley 32-1 to turn the direction (see arrow (17)), and the arm flexure wire 7-1 is guided upward in the drawing sheet surface of FIG. 10. Finally the other end portion of the arm flexure wire 7-1 is fixed to the substantially same position as the lower end portion of the second translation actuator 6-1 where the one end portion of the arm flexure wire 7-1 is fixed.

The same configuration as the above is formed at the position on the opposite side across the second structure 2 by the first rotating guide pulley 30-2, the second rotating guide pulley 31-2, the auxiliary rotating guide pulley 32-2, and the arm flexure wire 7-2.

Figure 11:
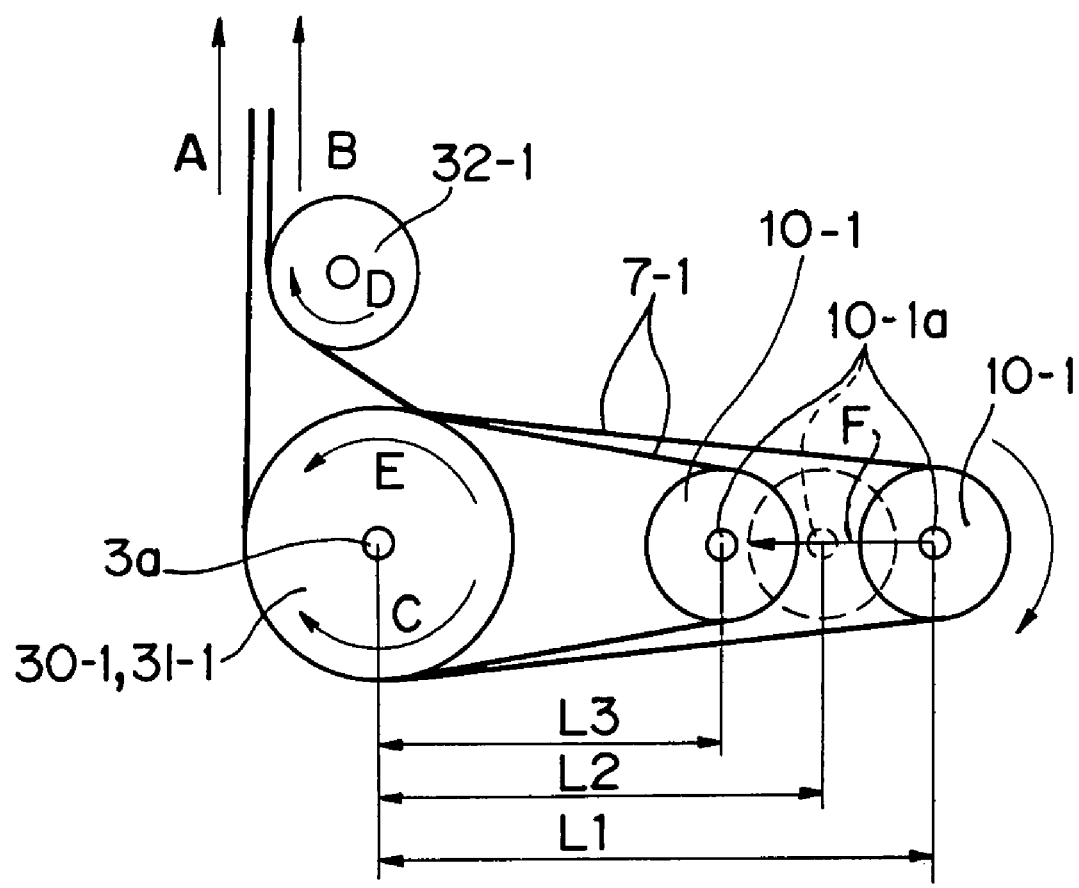
FIG. 11 is a view showing an operation of the joint structure according to the fourth embodiment of the present invention.

The joint structure operation of the fourth embodiment of the present invention will be described with reference to FIG. 11.

For the relative swing movement between the first structure 1 and the second structure 2 about the rotating shaft $3a$ of the first revolute joint 3, the relative swing movement between the first structure 1 and the second structure 2 has no influence on the movements of the levers 11-1 and 11-2 due to the same principle as FIG. 6A.

On the other hand, when the second translation actuator 6-1 is contracted, the both end portions of the arm flexure wire 7-1 are pulled in the directions shown by arrows B and B respectively. In order to meet this situation, the first rotating guide pulley 30-1 is rotated clockwise as shown by an arrow C to deliver the arm flexure wire 7-1 upward. The auxiliary rotating guide pulley 32-1 is rotated clockwise as shown by an arrow D, and the second rotating guide pulley 31-1 is rotated counterclockwise as shown by an arrow E, which delivers the arm flexure wire 7-1. As a result, the movable rotating pulley 10-1 is attracted as shown by an arrow F, and the distance L between the rotating shaft $3a$ of the first revolute joint 3 and the rotating shaft $10-1a$ of the movable rotating pulley 10-1 is changed from the distance L1 of the pre-movement to a distance L3. In FIG. 11, the movable rotating pulley 10-1 shown by a dotted line indicates the position of the movable rotating pulley 10-1 of the first embodiment shown in FIG. 6B, the distance L3 in FIG. 11 is smaller than the distance L2, and the movement distance of the movable rotating pulley 10-1 is increased by a difference (L2-L3).

According to the joint structure of the fourth embodiment of the present invention, the second rotating guide pulleys 31-1 and 31-2 and the auxiliary rotating guide pulleys 32-1 and 32-2 are arranged, which allows the second translation actuators 6-1 and 6-2 to pull the both ends of each of the arm flexure wires 7-1 and 7-2. Therefore, for the same contraction amount of the second translation actuators 6-1 and 6-2, the value of (L1-L2) which is of the movement amount of the movable rotating pulleys 10-1 and 10-2 becomes double compared with the first embodiment. Accordingly, the movable range of the robot arm joint can be increased.

Fifth Embodiment

Figure 12:
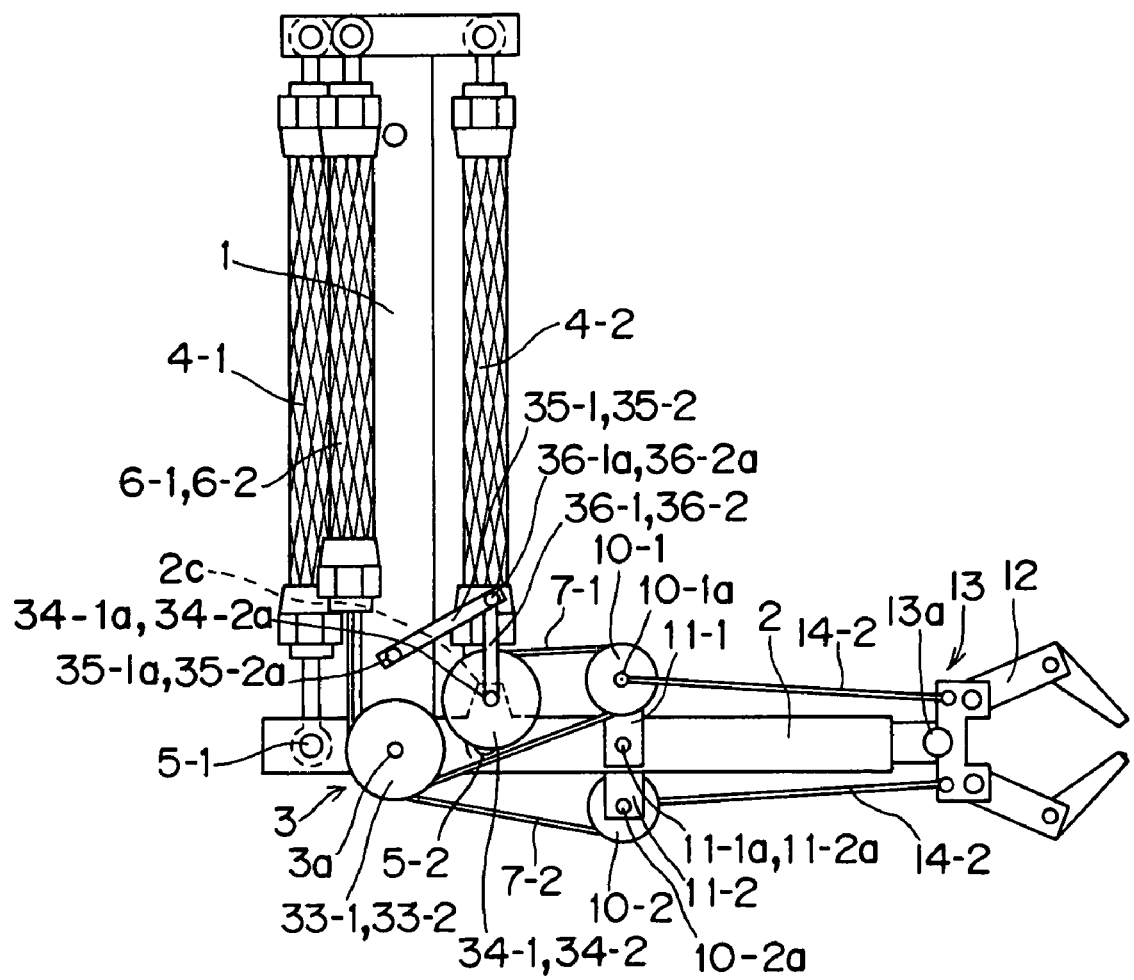
FIG. 12 is a plan view showing an almost entirety of a robot arm in the case where a joint structure according to a fifth embodiment of the present invention is applied to the robot arm.

FIG. 12 is an overall view of a robot arm in the case where a joint structure according to a fifth embodiment of the present invention is applied to the robot arm.

In FIG. 12, numerals 33-1 and 33-2 designate third rotating guide pulleys. The third rotating guide pulleys 33-1 and 33-2 are coaxial with the rotating shaft $3a$ of the first revolute joint 3 at the positions where the third rotating guide pulleys 33-1 and 33-2 face each other across the second structure 2, and the third rotating guide pulleys 33-1 and 33-2 are arranged while being freely rotatable about the rotating shaft 3a through the bearings or the like. In FIG. 12, the rear-side third rotating guide pulley 33-2 is not shown because the third rotating guide pulley 33-2 is hidden behind the front-side third rotating guide pulley 33-1.

Numerals 34-1 and 34-2 designate fourth rotating guide pulleys. The fourth rotating guide pulleys 34-1 and 34-2 have the same radiuses as those of the third rotating guide pulleys 33-1 and 33-2. At the positions where the fourth rotating guide pulleys 34-1 and 34-2 face each other across the second structure 2, the fourth rotating guide pulleys 34-1 and 34-2 are arranged in the second structure 2 while being freely rotatable through the bearings or the like with respect to rotating shafts 34-1a and 34-2a fixed to an upper-side projection portion 2c of the second structure 2, and the fourth rotating guide pulleys 34-1 and 34-2 can be relatively rotated about the rotating shafts 34-1a and 34-2a relative to the second structure 2.

Numerals 35-1 and 35-2 designate first parallel links. One end portion of each of the first parallel links 35-1 and 35-2 is connected to the first structure 1 at each of fulcrums 35-1a and 35-2a, and the first parallel links 35-1 and 35-2 can be relatively swung about the fulcrums 35-1a and 35-2a relative to the first structure 1 respectively.

Numerals 36-1 and 36-2 designate second parallel links. One end portion of each of the second parallel links 36-1 and 36-2 is connected to the other end portion of each of the first parallel links 35-1 and 35-2 at fulcrums 36-1a and 36-2a, and the second parallel links 36-1 and 36-2 can be relatively swung about the fulcrums 36-1a and 36-2a relative to the first parallel links 35-1 and 35-2 respectively. The other end portion of each of the second parallel links 35-1 and 35-2 is fixed to each of the fourth rotating guide pulleys 34-1 and 34-2, and the second parallel links 36-1 and 36-2 and the fourth rotating guide pulleys 34-1 and 34-2 cannot relatively be moved.

The first parallel links 35-1 and 35-2, the second parallel links 36-1 and 36-2, the first structure 1, and the second structure 2 form a four-node link structure (parallel link structure) having the four fulcrums of the fulcrums 35-1a and 35-2a, the fulcrums 36-1a and 36-2a, the rotating shaft 3a of the first revolute joint 3, and the rotating shafts 34-1a and 34-2a of the fourth rotating guide pulleys 34-1 and 34-2.

Figure 13:
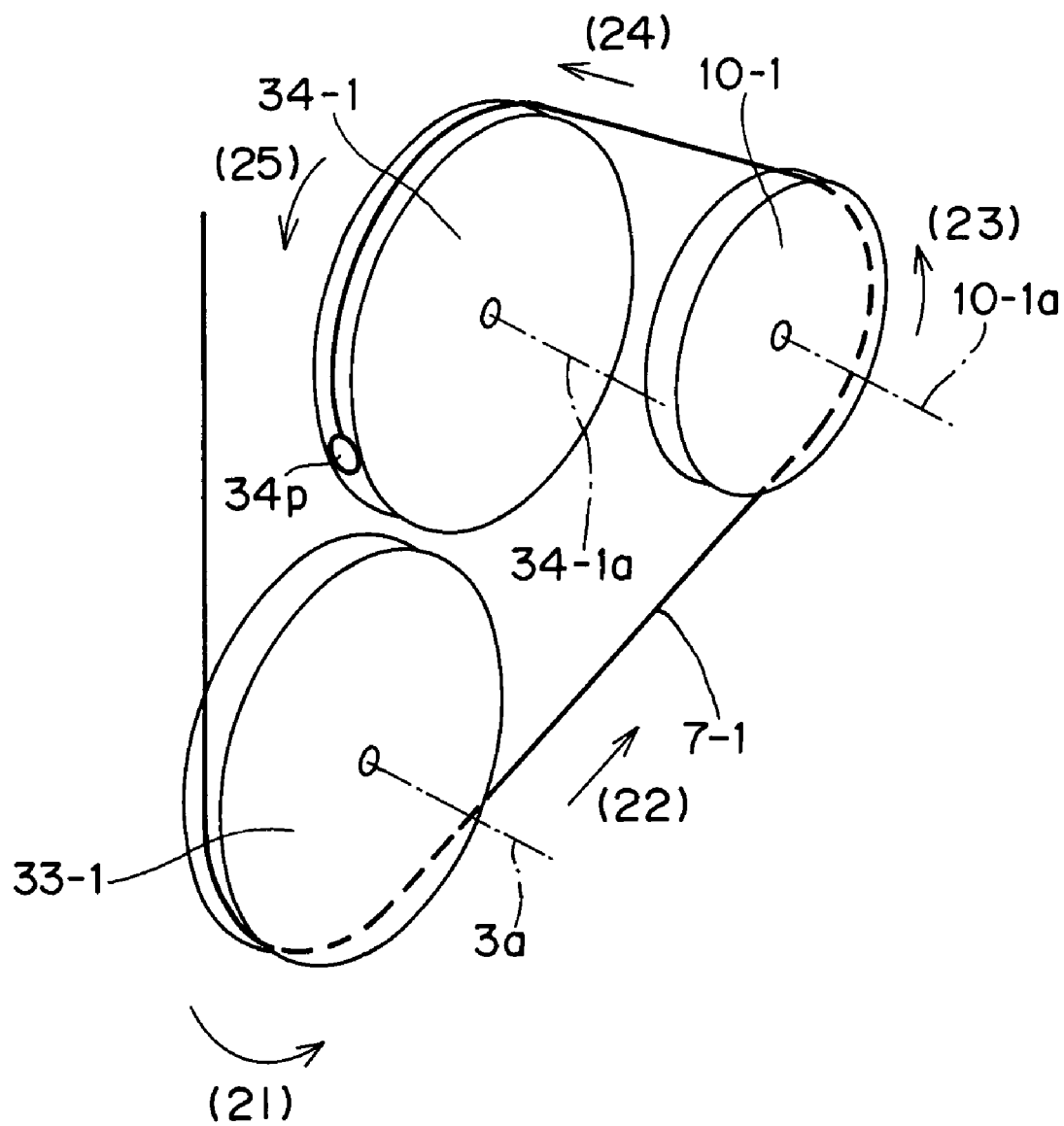
FIG. 13 is a perspective view showing a detailed structure of the joint structure according to the fifth embodiment of the present invention.

Then, the wire path of the wire guidance mechanism of the joint structure in the fifth embodiment will be described with reference to FIG. 13. FIG. 13 is a perspective view showing the detailed structure of the joint structure according to the fifth embodiment of the present invention. Although the wire is put round each pulley so as to be accommodated in each guide groove (similarly to FIG. 1B), the guide groove will be omitted in the following description and the corresponding drawing for the purpose of simplification.

The arm flexure wire 7-1 whose one end is fixed to the second translation actuator 6-1 is guided to the third rotating guide pulley 33-1, and the path of the arm flexure wire 7-1 is bent by the third rotating guide pulley 33-1 (see arrow (21)). Then, the arm flexure wire 7-1 is guided to the movable rotating pulley 10-1 and then to the lower side of the movable rotating pulley 10-1 from below the joint shaft 3a of the first revolute joint 3 in the drawing sheet surface of FIG. 13 (see arrow (22)). Then, the arm flexure wire 7-1 is bent so as to turn the direction by the movable rotating pulley 10-1 (see arrow (23)), and the arm flexure wire 7-1 is guided to the upper side of the second rotating guide pulley 34-1 from the upper side of the movable rotating pulley 10-1 in the drawing sheet surface of FIG. 13 (see arrow (24)).

Then, the arm flexure wire 7-1 runs along the outer circumference of the fourth rotating guide pulley 34-1 (see arrow (25)), and thereafter, the end portion of the arm flexure wire 7-1 is fixed to the fourth rotating guide pulley 34-1 with a wire fixing pin 34p.

The path of the arm flexure wire 7-2 with respect to the third rotating guide pulley 33-2, the fourth rotating guide pulley 34-2, and the movable rotating pulley 10-2 is similar to the path of the arm flexure wire 7-1, so that the detailed description will be omitted.

The joint structure operation of the fifth embodiment of the present invention will be described with reference to FIG. 14.

Figure 14:
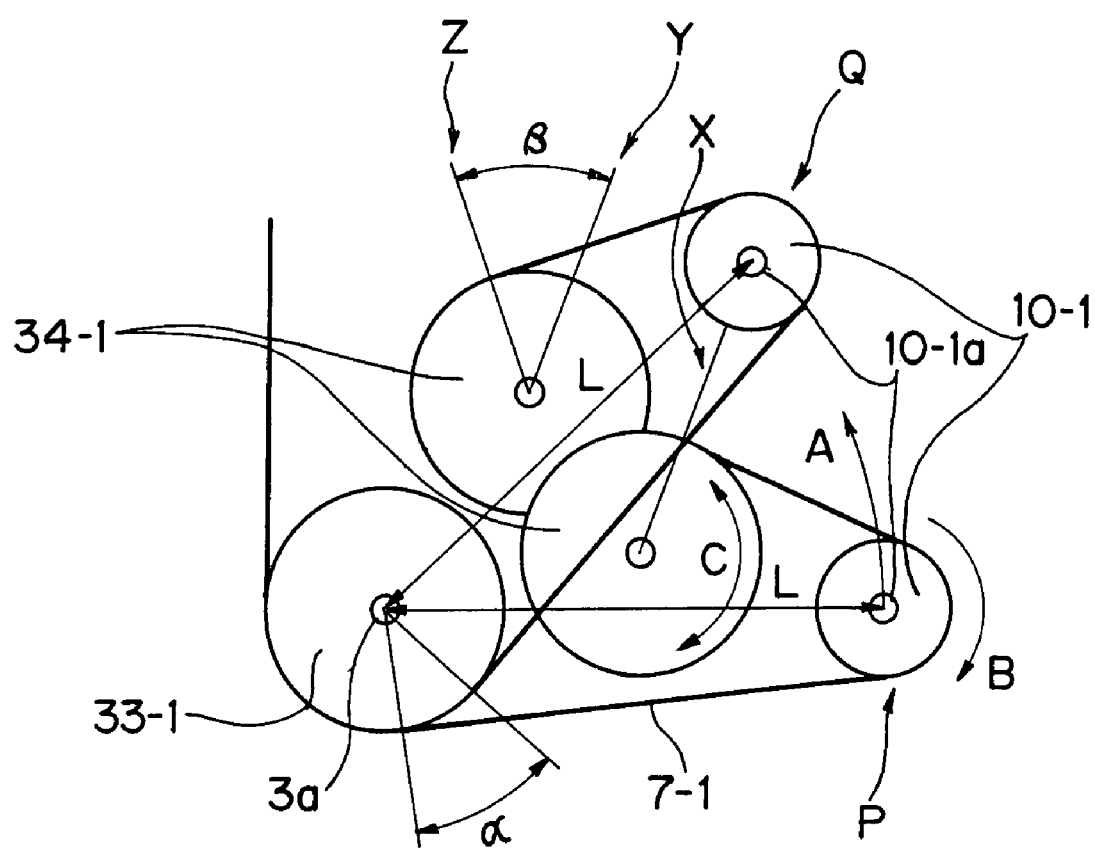
FIG. 14 is a view showing an operation of the joint structure according to the fifth embodiment of the present invention.

In the case where the counterclockwise rotational movement of the second structure 2 is generated about the rotating shaft 3a of the first revolute joint 3 by the operations of the first translation actuators 4-1 and 4-2, the relative rotational movements of the movable rotating pulley 10-1 and the fourth rotating guide pulley 34-1 relative to the third rotating guide pulley 33-1 is generated about the rotating shaft 3a of the first revolute joint 3 as shown by an arrow A of in FIG. 14. At this point, the amount in which the arm flexure wire 7-1 is put round the circumferential portion of the third rotating guide pulley 33-1 is increased by a part of the circumference corresponding to the angle $\alpha$.

On the other hand, it is assumed that $\beta$ is an angle formed between an auxiliary line Y and a perpendicular Z. The auxiliary line Y is parallel to a perpendicular X of the arm flexure wire 7-1 put between the movable rotating pulley 10-1 and the fourth rotating guide pulley 34-1 in the case where the movable rotating pulley 10-1 is located at a position P. The perpendicular Z is the perpendicular of the arm flexure wire 7-1 put between the movable rotating pulley 10-1 and the fourth rotating guide pulley 34-1 in the case where the movable rotating pulley 10-1 is located at a position Q. Because the fourth rotating guide pulley 34-1 is connected to the first structure 1 by the parallel link structure, the rotational movement shown by an arrow C is not generated (however, the relative rotational movement is generated between the fourth rotating guide pulley 34-1 and the second structure 2). Therefore, the amount in which the arm flexure wire 7-1 is put round the circumferential portion of the fourth rotating guide pulley 34-1 is decreased by a part of the circumference corresponding to the angle $\beta$ by the counterclockwise rotational movement of the first structure 2 about the rotating shaft 3a of the first revolute joint 3.

In this case, in consideration of the geometric relationship, because of angle $\alpha$=angle $\beta$, the increase which is of the part of the circumference corresponding to the angle $\alpha$ and the decrease which is of the part of the circumference corresponding to the angle $\beta$ cancel each other, and thus, the distance L between the first rotating guide pulley 33-1 and the movable rotating pulley 10-1 is not changed. Accordingly, the rotational movement relative to the second structure 2 is not generated about the fulcrum 11-1a of the lever 11-1.

When the second translation actuator 6-1 is contracted, the distance between the rotating shaft 3a of the first revolute joint 3 and the rotating shaft 10-1a of the movable rotating pulley 10-1 is changed due to the same principle as FIG. 6B.

According to the joint structure of the fifth embodiment of the present invention, the fourth rotating guide pulleys 34-1 and 34-2 to which the parallel link structures are connected can be arranged in the same plane as the third rotating guide pulleys 33-1 and 33-2 and the movable rotating pulleys 10-1 and 10-2. Therefore, when compared with the first embodiment, a thickness can be reduced in an axial direction of the rotating shaft 3a of the first revolute joint 3, which allows the robot arm having the compact joint structure. Because the fourth rotating guide pulleys 34-1 and 34-2 can also be arranged in the same plane as the third rotating guide pulleys 33-1 and 33-2 and the movable rotating pulleys 10-1 and 10-2, the arm flexure wires 7-1 and 7-2 hardly drop out from the guide grooves of the pulleys respectively, and the robot arm can preferably be moved at high speed.

Sixth Embodiment

Figure 15:
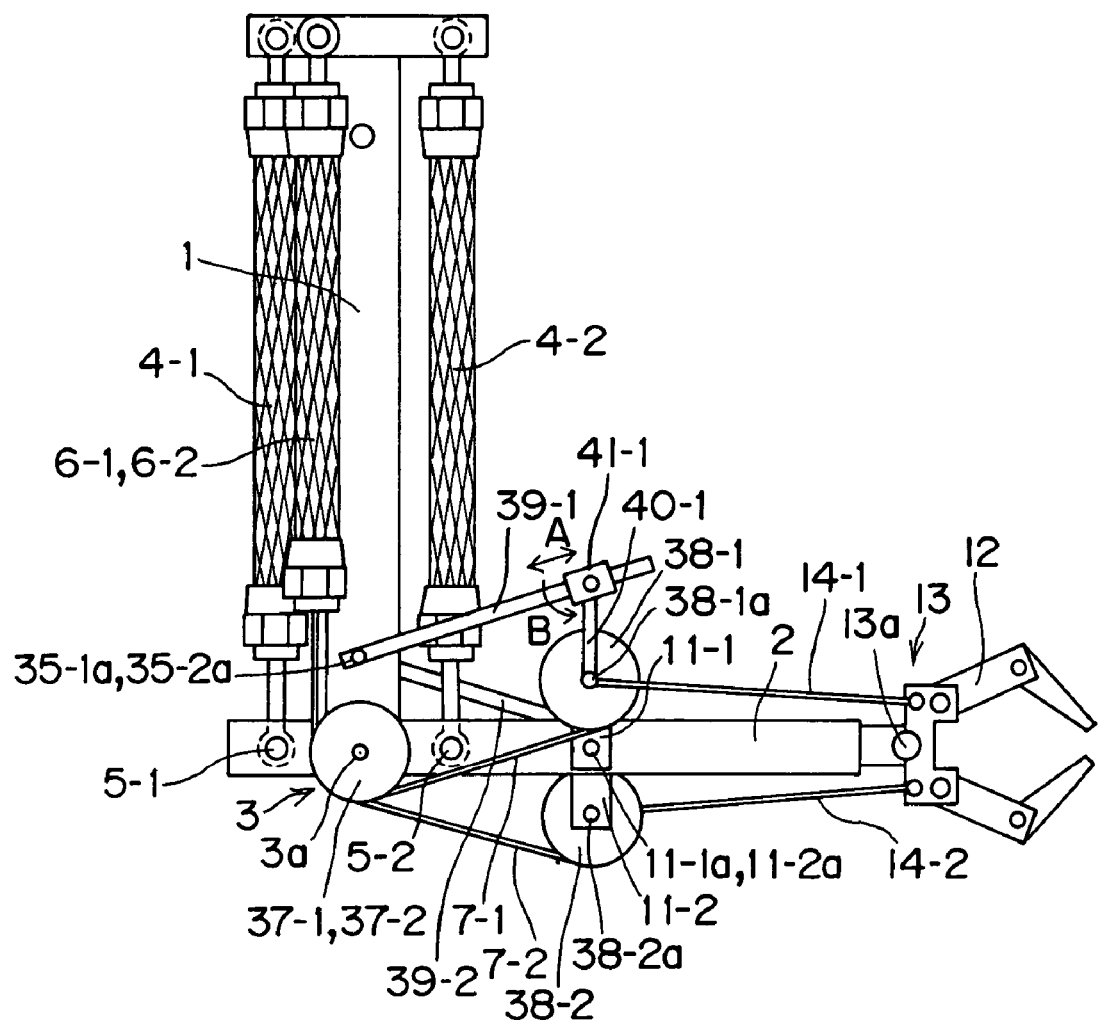
FIG. 15 is a plan view showing an almost entirety of a robot arm in the case where a joint structure according to a sixth embodiment of the present invention is applied to the robot arm.

FIG. 15 is an overall view of a robot arm in the case where a joint structure according to a sixth embodiment of the present invention is applied to the robot arm.

In FIG. 15, numerals 37-1 and 37-2 designate rotating guide pulleys. The rotating guide pulleys 37-1 and 37-2 are coaxial with the rotating shaft 3a of the first revolute joint 3 at the positions where the rotating guide pulleys 37-1 and 37-2 face each other across the second structure 2, and the rotating guide pulleys 37-1 and 37-2 are arranged while being freely rotatable about the rotating shaft 3a through the bearings or the like. In FIG. 15, the rear-side rotating guide pulley 37-2 is not shown because the rotating guide pulley 37-2 is hidden behind the front-side rotating guide pulley 37-1.

Numerals 38-1 and 38-2 designate movable guide pulleys. The movable guide pulleys 38-1 and 38-2 have the same radiuses as those of the rotating guide pulleys 37-1 and 37-2. The movable guide pulleys 38-1 and 38-2 are arranged in the upper end portion of the lever 11-1 and the lower end portion of the lever 11-2 while being freely rotatable respectively, and the movable guide pulleys 38-1 and 38-2 can be relatively rotated about the rotating shafts 38-1a and 38-2a relative to the levers 11-1 and 11-2 respectively.

Numerals 39-1 and 39-2 designate first parallel links. One end portion of each of the first parallel links 39-1 and 39-2 is connected to the first structure 1 at each of the fulcrums 35-1a and 35-2a while being freely rotatable, and the first parallel links 39-1 and 39-2 can be swung about the fulcrums 35-1a and 35-2a relative to the first structure 1 respectively.

Numerals 40-1 and 40-2 designate second parallel links. One end of each of the second parallel links 40-1 and 40-2 is rotatably coupled to translation and revolute joints 41-1 and 41-2, and the other end of each of the second parallel links 40-1 and 40-2 is fixed to each of the movable guide pulleys 38-1 and 38-2. The second parallel links 40-1 and 40-2 are connected to the first parallel links 39-1 and 39-2 by the translation and revolute joints 41-1 and 41-2 while being able to be translated and rotated respectively. The translation and revolute joint 41-1 has a degree of freedom of the translation and a degree of freedom of the rotation such that the translation and revolute joint 41-1 is fitted in the first parallel link 39-1 or sandwiched between the first parallel links 39-1 while being slidably and relatively rotatably in the directions shown by arrows A and B in FIG. 15 relative to the first parallel link 39-1. The translation and revolute joint 41-2 also has the same structure for the first parallel link 39-2. Accordingly, the first parallel links 39-1 and 39-2 and the second parallel links 40-1 and 40-2 can be relatively translated and swung by the translation and revolute joints 41-1 and 41-2 respectively. The other end of each of the second parallel links 40-1 and 40-2 is fixed to each of the movable guide pulleys 38-1 and 38-2, and the second parallel links 40-1 and 40-2 and the movable guide pulleys 38-1 and 38-2 cannot relatively be moved. Therefore, the second parallel link 40-1 and the movable guide pulley 38-1 and the second parallel link 40-2 and the movable guide pulley 38-2 are integrally rotated respectively.

Therefore, the first parallel links 39-1 and 39-2, the second parallel links 40-1 and 40-2, the first structure 1, and the second structure 2 form a four-node link structure (parallel link structure) having the four fulcrums of the fulcrums 35-1a and 35-2a, the translation and revolute joints 41-1 and 41-2, the rotating shaft 3a of the first revolute joint 3, and the rotating shafts 38-1a and 38-2a of the movable guide pulleys.

Figure 16:
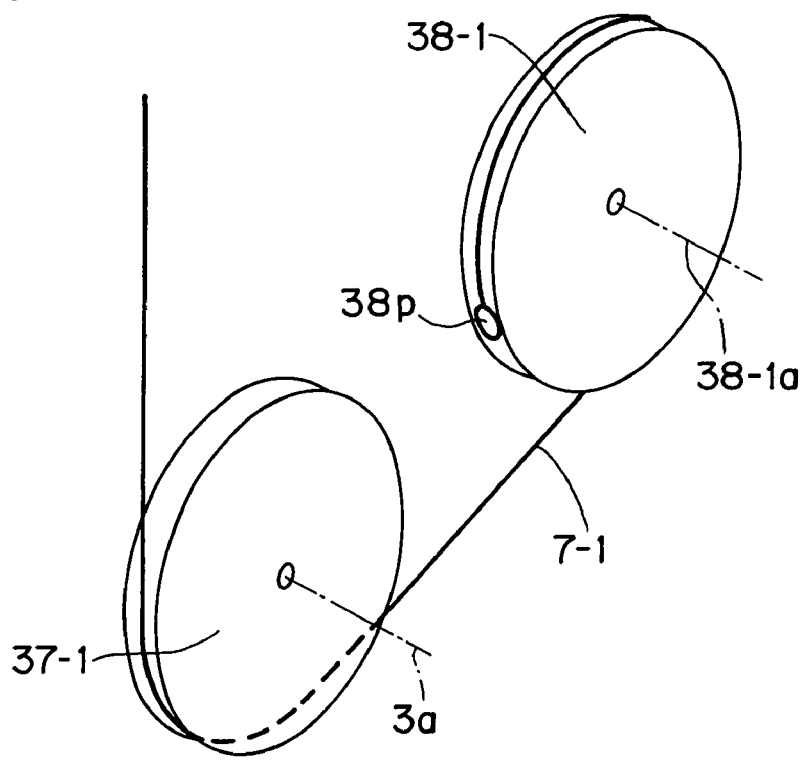
FIG. 16 is a perspective view showing a detailed structure of the joint structure according to the sixth embodiment of the present invention.

Next, the wire path of the joint structure in the sixth embodiment will be described with reference to FIG. 16. FIG. 16 is a perspective view showing a detailed structure of the joint structure according to the sixth embodiment of the present invention. Although the wire is put round each pulley so as to be accommodated in each guide groove (similarly to FIG. 1B), the guide groove will be omitted in the following description and the corresponding drawing for the purpose of simplification.

The arm flexure wire 7-1 whose one end is fixed to the second translation actuator 6-1 is guided to the third rotating guide pulley 37-1, and the path of the arm flexure wire 7-1 is bent by the third rotating guide pulley 37-1. Then, the arm flexure wire 7-1 is guided to the movable rotating pulley 38-1 and to the lower side of the movable rotating pulley 38-1 from below the joint shaft 3a of the first revolute joint 3 in the drawing sheet surface of FIG. 16. Then, after the arm flexure wire 7-1 runs along the outer circumference of the movable pulley 38-1, the end portion of the arm flexure wire 7-1 is fixed to the movable pulley 38-1 with a wire fixing pin 38p.

The path of the arm flexure wire 7-2 with respect to the rotating guide pulley 37-2 and the movable pulley 38-2 is similar to the path of the arm flexure wire 7-1, so that the detailed description will be omitted.

The joint structure operation of the sixth embodiment of the present invention will be described with reference to FIG. 17.

Figure 17:
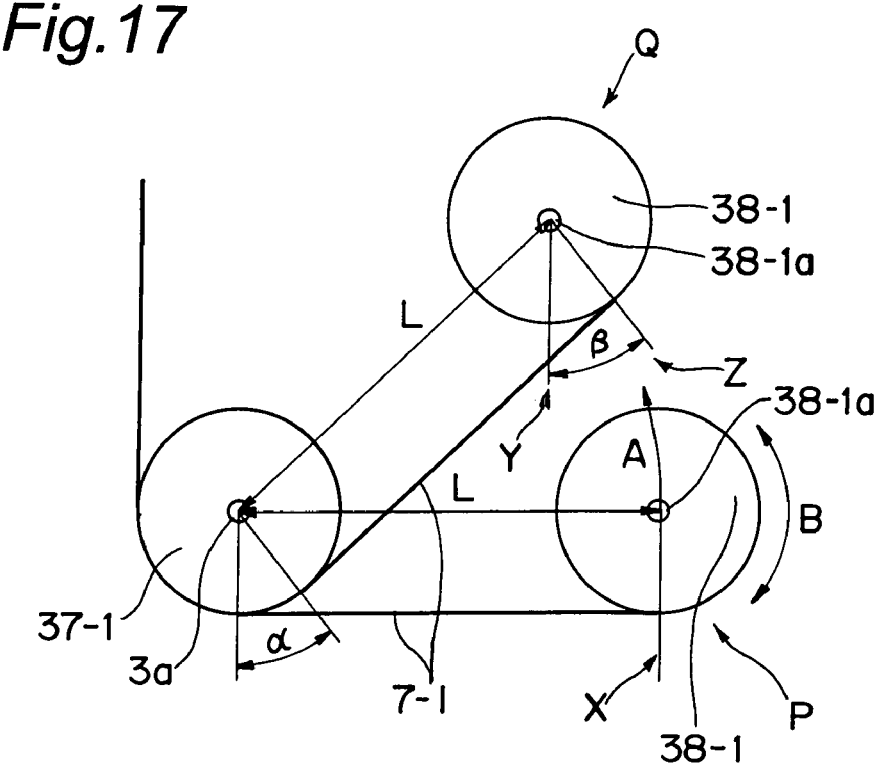
FIG. 17 is a view showing an operation of the joint structure according to the sixth embodiment of the present invention.

In the case where the counterclockwise rotational movement of the second structure 2 is generated about the rotating shaft 3a of the first revolute joint 3 by the operations of the first translation actuators 4-1 and 4-2, the relative rotational movements of the movable pulley 38-1 relative to the rotating guide pulley 37-1 is generated about the rotating shaft 3a of the first revolute joint 3 as shown by an arrow A of in FIG. 17. At this point, the amount in which the arm flexure wire 7-1 is put round the circumferential portion of the rotating guide pulley 37-1 is increased by a part of the circumference corresponding to the angle α.

On the other hand, it is assumed that β is the angle formed between the auxiliary line Y and a perpendicular Z. The auxiliary line Y is parallel to the perpendicular X of the arm flexure wire 7-1 put between the first rotating guide pulley 37-1 and the movable pulley 38-1 in the case where the movable pulley 38-1 is located at the position P. The perpendicular Z is the perpendicular of the arm flexure wire 7-1 put between the first rotating guide pulley 37-1 and the movable pulley 38-1 in the case where the movable pulley 38-1 is located at the position Q. Because the movable pulley 38-1 is connected to the first structure 1 by the parallel link structure, the rotational movement shown by an arrow B is not generated (however, the relative rotational movement is generated between the movable pulley 38-1 and the lever 11-1). Therefore, the amount in which the arm flexure wire 7-1 is put round the circumferential portion of the movable pulley 38-1 is decreased by a part of the circumference corresponding to the angle β by the counterclockwise rotational movement of the first structure 2 about the rotating shaft 3a of the first revolute joint 3.

In this case, in consideration of the geometric relationship, because of angle α=angle β, the increase which is of the part of the circumference corresponding to the angle α and the decrease which is of the part of the circumference corresponding to the angle β cancel each other, and the distance L between the rotating guide pulley 37-1 and the movable pulley 38-1 is not changed. Accordingly, the relative rotational movement relative to the second structure 2 is not generated about the fulcrum 11-1a of the lever 11-1.

When the second translation actuator 6-1 is contracted, the arm flexure wire 7-1 is pulled. However, because the end portion of the wire 7-1 is fixed to the movable pulley 38-1, the movable pulley 38-1 is attracted toward the rotating guide pulley 37-1 to change the distance L between the rotating shaft 3a of the first revolute joint 3 and the rotating shaft 38-1a of the movable pulley 38-1. In this case, when the distance L is shortened by the contraction of the second translation actuator 6-1, the translation and revolute joint 41-1 is translated in the direction, in which the translation and revolute joint 41-1 is brought close to the fulcrum 35-1a along the first parallel link 39-1, to maintain the parallel link structure.

The joint structure of the sixth embodiment of the present invention corresponds to the structure in which the second rotating guide pulleys 34-1 and 34-2 and the movable guide pulleys 10-1 and 10-2 of the fifth embodiment are integrated respectively.

According to the joint structure of the sixth embodiment of the present invention, the joint structure can be operated when only the rotating guide pulleys 37-1 and 37-2 and the movable pulleys 38-1 and 38-2 are used as the guide pulley, and the number of components can be decreased. Accordingly, the joint structure of the sixth embodiment provides the robot arm having the simple joint structure with the small number of components.

Seventh Embodiment

Figure 19A:
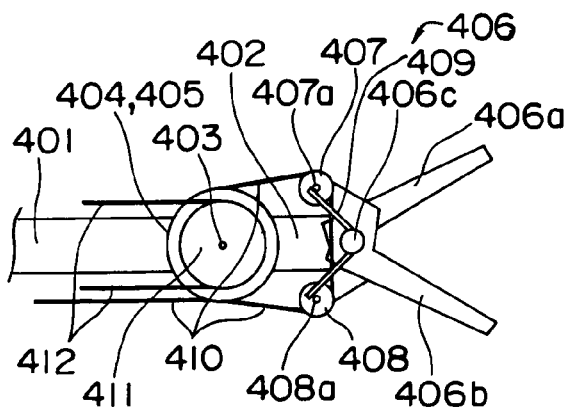
FIG. 19A is an overall view showing a structure of a wire guidance mechanism while a gripper is opened in a joint mechanism according to a seventh embodiment of the present invention.
Figure 19B:
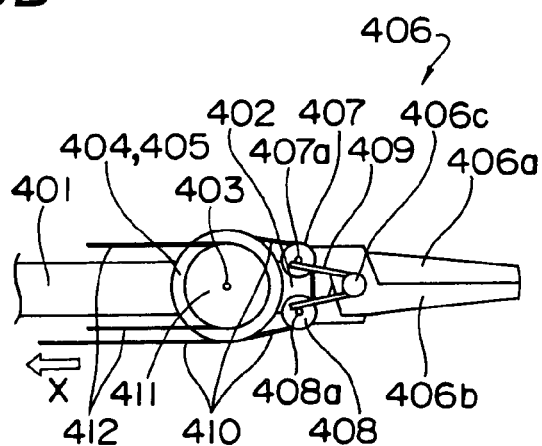
FIG. 19B is an overall view showing the structure of the wire guidance mechanism while the gripper is closed in the joint mechanism according to the seventh embodiment of the present invention.
Figure 19C:
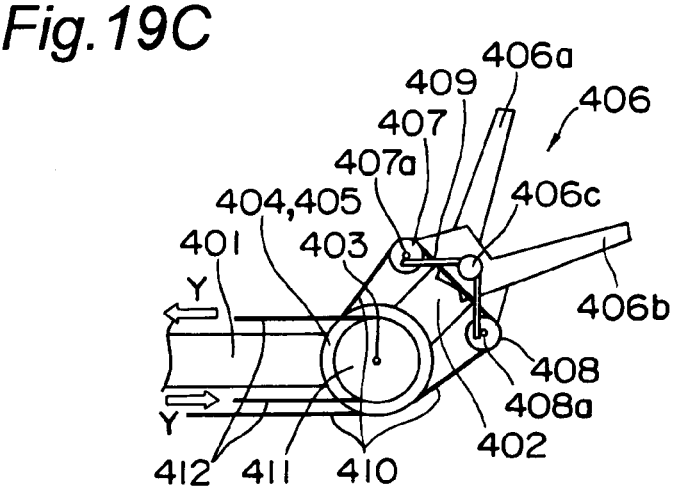
FIG. 19C is an overall view showing the structure of the wire guidance mechanism while the gripper is swung in the joint mechanism according to the seventh embodiment of the present invention.

FIGS. 19A, 19B, and 19C are overall views showing a structure of a wire guidance mechanism in a joint mechanism according to a seventh embodiment of the present invention. The seventh embodiment of the present invention shown in FIGS. 19A, 19B, and 19C is an example of the case in which two movable rotating pulleys are included.

In FIGS. 19A, 19B, and 19C, numeral 401 designates a rod-shape first structure, and numeral 402 designates a rod-shape second structure. The first structure 401 and the second structure 402 are connected to each other with a revolute joint 403, and the first structure 401 and the second structure 402 can relatively be rotated about a joint shaft 403a of the revolute joint 403.

Numeral 404 designates a rotating guide pulley with a guide groove 404a. The rotating guide pulley 404 is coaxial with the rotating shaft 403a of the revolute joint 403, and the rotating guide pulley 404 is arranged in the second structure 2 while being freely rotatable to the rotating shaft 403a through the bearing or the like. That is, the rotating guide pulley 404 can freely be rotated about the rotating shaft 403a.

Numeral 405 designates a fixed guide pulley with a guide groove 405a which is of an example of the fixed guide. The fixed guide pulley 405 has the same radiuses as that of the rotating guide pulley 404, the fixed guide pulley 405 is arranged so as to be coaxial with the rotating shaft 403a of the revolute joint 403. Because the fixed guide pulley 405 is fixed to the first structure 401, the relative rotational movement is not generated between the fixed guide pulley 405 and the first structure 401.

Numeral 406 designates a gripper which is constructed by a first finger 406a, a second finger 406b, and a hinge 406c. The first finger 406a and the second finger 406b can be opened and closed by the hinge 406c, and the hinge 406c is fixed to an end portion (different from an end portion connected to the first structure 401) of the second structure 402.

Numeral 407 designates a first movable rotating pulley with a guide groove 407b. The first movable rotating pulley 407 is arranged in the base end portion of the first finger 406a, and the first movable rotating pulley 407 can be rotated about a rotating shaft 407a.

Numeral 408 designates a second movable rotating pulley with a guide groove 408b. The second movable rotating pulley 408 is arranged in the base end portion of the second finger 406b, and the second movable rotating pulley 408 can be rotated about a rotating shaft 408a.

Numeral 409 designates a torsion coil spring. In the torsion coil spring 409, a coil portion is hooked over the hinge 406c, both end portions are hooked over the rotating shaft 407a of the first movable rotating pulley 407 and the rotating shaft 408a of the second movable rotating pulley 408 respectively. The gripper 406 is kept open as shown in FIG. 19A by repulsive force of the coil spring 409.

Numeral 410 designates a gripper drive wire. One end portion of the gripper drive wire 410 is fixed to the first drive actuator (for example, the two first translation actuators 4-1 and 4-2 such as the pneumatic artificial muscle of FIG. 1A). The gripper drive wire 410 is put round in the order of the guide groove 404a of the rotating guide pulley 404, the guide groove 408b of the second movable rotating pulley 408, and the guide groove 407b of the first movable rotating pulley 407. The other end portion of the gripper drive wire 410 is fixed to the fixed guide pulley 405 by a wire fixing pin 410p.

The 411 designates a revolute joint drive pulley with a guide groove 411a. The revolute joint drive pulley 411 is arranged so as to be coaxial with the rotating shaft 403a of the revolute joint 403. The revolute joint drive pulley 411 is fixed to the second structure 402, so that the relative rotational movement is not generated between the revolute joint drive pulley 411 and the second structure 402.

The 412 designates a revolute joint drive wire which is put round in the guide groove 411a of the revolute joint drive pulley 411. Both end portions of the revolute joint drive wire 412 are fixed to a second drive actuator and a third drive actuator (not shown respectively, for example, which include the pneumatic artificial muscle, the motor, and the cylinder capable of constituting actuator).

Figure 20:
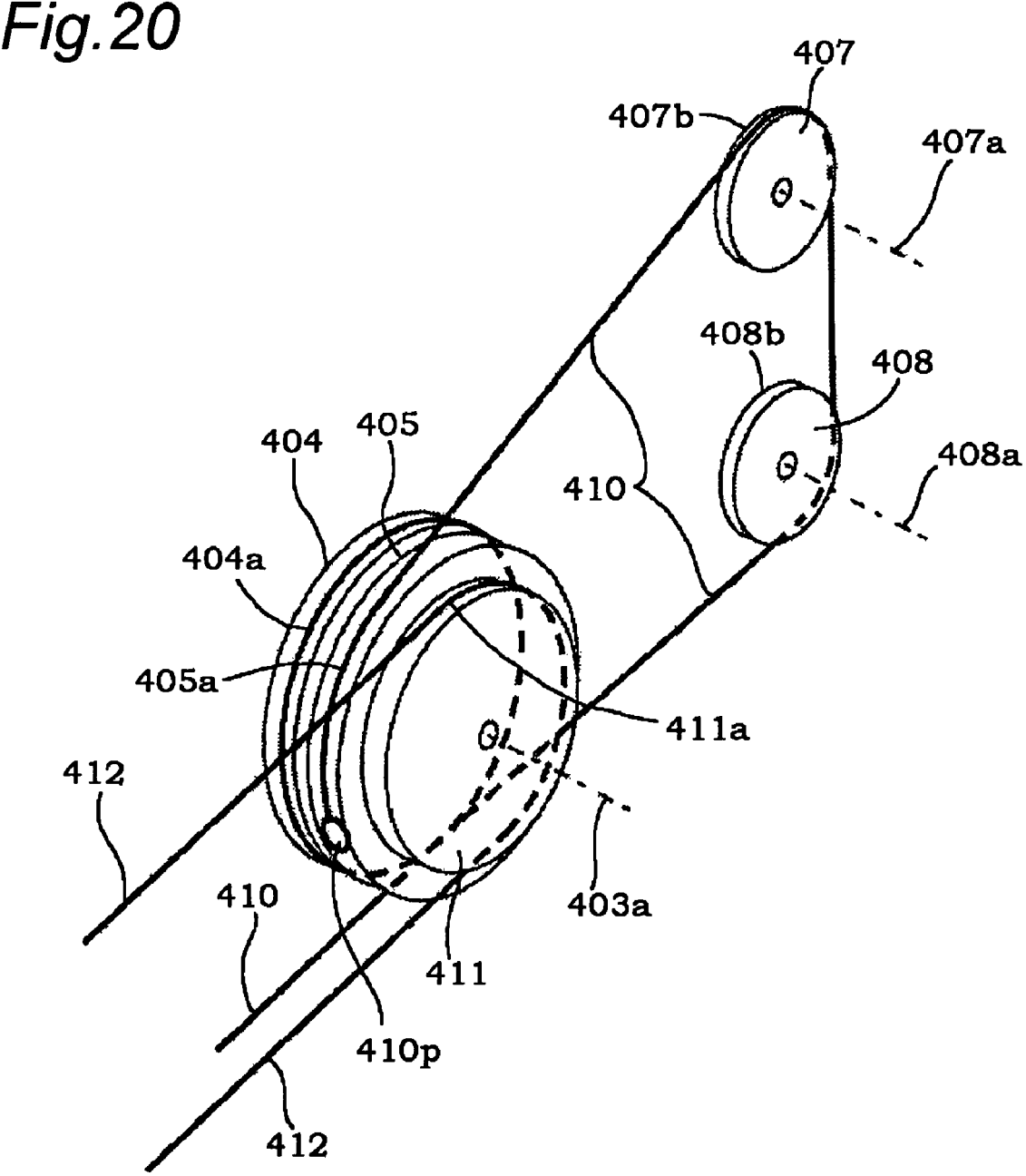
FIG. 20 is a perspective view showing the structure of the wire guidance mechanism in the joint mechanism according to the seventh embodiment of the present invention.

Then, the path of the gripper drive wire 410 with respect to the rotating guide pulley 404, the fixed guide pulley 405, the first movable rotating pulley 407, and the second movable rotating pulley 408 will be described with reference to FIG. 20. As described above, although the wire is put round each pulley so as to be accommodated in each guide groove, the guide groove will be omitted in the following description.

The gripper drive wire 410 whose one end is fixed to the first drive actuator is guided to the rotating guide pulley 404, the gripper drive wire 410 substantially goes around the rotating guide pulley 404, and the gripper drive wire 410 is guided to the second movable rotating pulley 408 and to the lower side of the second movable rotating pulley 408 from below the joint shaft 403a of the revolute joint 403 in the drawing sheet surface of FIG. 20. Then, the gripper drive wire 410 is bent to turn the direction upward by the second movable rotating pulley 408, and the gripper drive wire 410 is guided to the first movable rotating pulley 407 and to the right side of the first movable rotating pulley 407 in the drawing sheet surface of FIG. 20. Then, the gripper drive wire 410 is bent to turn the direction leftward by the first movable rotating pulley 407, and the gripper drive wire 410 is guided to the upper portion side of fixed guide pulley 405 from the upper portion side of the first movable rotating pulley 407 in the drawing sheet surface of FIG. 20. Then, after the gripper drive wire 410 runs along the outer circumference of the fixed guide pulley 405, the end portion of the gripper drive wire 410 is fixed to the fixed guide pulley 405 with the wire fixing pin 410p.

The operation of the wire guidance mechanism having the above-described configuration will be described below.

In the case where the gripper drive wire 410 is driven as shown by an arrow X of FIG. 19B, the operation is performed such that the distance between the rotating guide pulley 404 and the rotating shafts of the first movable rotating pulley 407 and the second movable rotating pulley 408 is shortened by the same principle as FIG. 6B in the first embodiment, and the gripper 406 is closed from the state shown in FIG. 19A to the state shown in FIG. 19B. On the other hand, in the case where the gripper drive wire 410 is driven toward the direction in which the gripper drive wire 410 is released opposite to the direction of the arrow X, the gripper 406 is opened from the state shown in FIG. 19B to the state shown in FIG. 19A by the repulsive force of the torsion coil spring 409.

When the revolute joint drive wire 412 is driven as shown by an arrow Y of FIG. 19C, the revolute joint drive wire 412 is put round the revolute joint drive pulley 411, and the revolute joint drive pulley 411 is fixed to the second structure 402, so that the rotational movement of the revolute joint 403 is generated to swing the gripper 406 counter-clockwise from the state shown in FIG. 19A to the state shown in FIG. 19C. On the other hand, when the revolute joint drive wire 412 is driven toward the direction opposite to the arrow Y, the gripper 406 is swung clockwise.

During the swing movement, the operation is performed such that the distance between the rotating guide pulley 404 and the rotating shafts of the first movable rotating pulley 407 and the second movable rotating pulley 408 is maintained by the same principle as FIG. 6A in the first embodiment, and the gripper 406 is not operated.

Thus, according to the wire guidance mechanism of the seventh embodiment of the present invention as described above, the mechanism is constructed so that the gripper drive wire 410 is induced by the rotating guide pulley 404, the fixed guide pulley 405, the first movable rotating pulley 407, and the second movable rotating pulley 408. Therefore, the gripper 406 can independently be opened and closed by the gripper drive wire 410 without being influenced by the rotational movement of the revolute joint 403 about the rotating shaft 403a.

A robot forceps system for a laparoscopic surgery or a telesurgery can be realized by applying the gripper drive mechanism.

The present invention is not limited to the above embodiments, but various modes could be made.

Figure 18A:
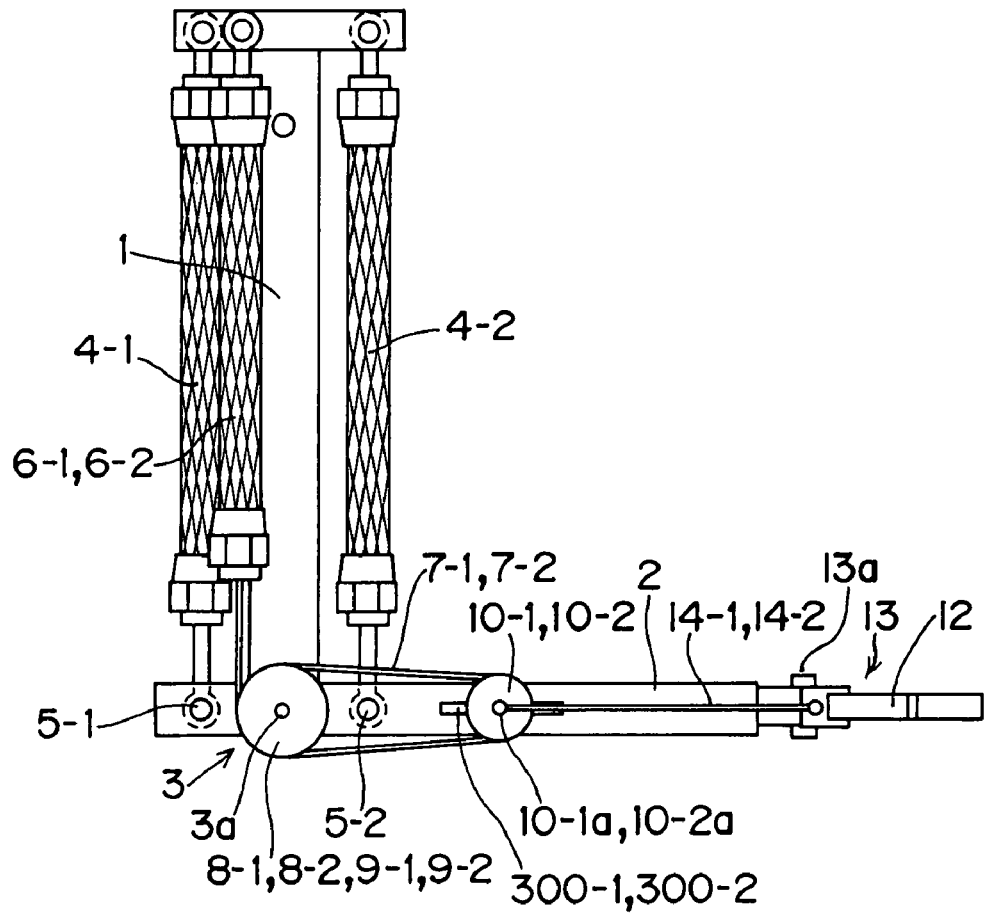
FIG. 18A is a side view showing an almost entirety of a robot arm in the case where a joint structure according to another embodiment of the present invention is applied to the robot arm.
Figure 18B:
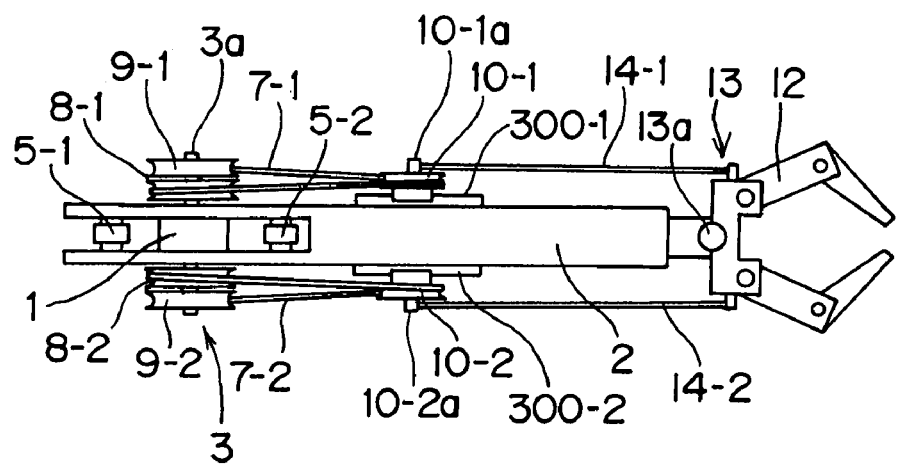
FIG. 18B is a bottom view showing the almost entirety of the robot arm in the case where the joint structure according to another embodiment of the present invention is applied to the robot arm.

For example, as shown in FIGS. 18A and 18B, linear guides 300-1 and 300-2 are provided along a longitudinal direction of the second structure 2 instead of the swinging lever, and the movable rotating pulleys 10-1 and 10-2 are freely moved along linear guides 300-1 and 300-2 in the longitudinal direction of the second structure 2 by the arm flexure wires 7-1 and 7-2 respectively, which also allows the same action and effect as the lever to be obtained.

Although the translation actuator is used as the actuator which drives the robot arm in the above embodiments, the present invention is not limited to the translation actuator. Even in a rotary electric motor, for example, when the pulley is fixed to the rotating shaft of the motor to wind the wire by the rotation of the motor, the same effect is exerted.

Although the pneumatic artificial muscle is used as the translation actuator in the above embodiments, the present invention is not limited to the pneumatic artificial muscle. For example, the same effect is also exerted in other translation actuators such as a pneumatic cylinder, a hydraulic cylinder, or an electric-motor linear actuator.

By properly combining the arbitrary embodiments of the aforementioned various embodiments, the effects possessed by the embodiments can be produced.

The joint structure of the present invention is useful to the joint structure in the joint mechanism of the multiple-joint robot arm. In addition to the robot arm, the present invention can be applied to both the joint structure in the joint mechanism of the mechanical apparatus such as the joint mechanism for the rotating mechanism in the production facility and the joint structure in the joint mechanism of the multiple-joint robot arm of the medical telesurgery apparatus.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A joint structure comprising:
   a first structure;
   a second structure;
   a revolute joint for connecting the first structure and the second structure;
   a rotating guide pulley which is coaxial with a rotating shaft of the revolute joint and arranged so as to be rotatable about the rotating shaft;
   a fixed guide which is arranged in the first structure, the fixed guide having an arc portion;
   a movable rotating guide pulley which is arranged in the second structure so as to be relatively movable;
   a wire which is put round the rotating guide pulley, the movable rotating guide pulley, and the fixed guide in an order of the rotating guide pulley, the movable rotating guide pulley, and the fixed guide;
   a first drive apparatus, which is included in the first structure, for rotating the second structure about the revolute joint without changing a distance from the movable rotating guide pulley to the rotating guide pulley; and
   a second drive apparatus, which is included in the first structure, for driving the wire, and moving the movable rotating guide pulley to change the distance to the rotating guide pulley by driving the wire,
   wherein the second structure is rotated about the revolute joint by driving the first drive apparatus without changing the distance from the movable rotating guide pulley to the rotating guide pulley.

2. A joint structure according to claim 1, wherein the fixed guide is formed as a part of a member fixed to the first structure.

3. A joint structure according to claim 1, wherein the movable rotating guide pulley has a structure in which a first movable rotating guide pulley whose guide groove is located in a same plane as a plane including a guide groove of the rotating guide pulley and a second movable rotating guide pulley whose guide groove is located in a same plane as a plane including a guide groove of the fixed guide are integrally formed.

4. A joint structure according to claim 1, wherein the movable rotating guide pulley has a first guide groove located in a same plane as a plane including a guide groove of the rotating guide pulley and a second guide groove located in a same plane as a plane including a guide groove of the fixed guide.

5. A joint structure comprising:
a first structure;
a second structure;
a revolute joint for connecting the first structure and the second structure;
a first rotating guide pulley and a second rotating guide pulley which are coaxial with a rotating shaft of the revolute joint, the first rotating guide pulley and the second rotating guide pulley being arranged in the first structure or the second structure so as to be rotatable about the rotating shaft respectively, the first rotating guide pulley and the second rotating guide pulley being capable of rotating relative to each other;
a movable rotating guide pulley which is arranged in the second structure so as to be relatively movable;
an auxiliary rotating guide pulley which is provided in the first structure while freely rotated;
a wire which is put round the first rotating guide pulley, the movable rotating guide pulley, the second rotating guide pulley, and the auxiliary rotating guide pulley in an order of the first rotating guide pulley, the movable rotating guide pulley, the second rotating guide pulley, and the auxiliary rotating guide pulley, both end portions of the wire being fixed to the second drive apparatus;
a first drive apparatus, which is included in the first structure, for rotating the second structure about the revolute joint without changing a distance from the movable rotating guide pulley to the first and second rotating guide pulleys; and
a second drive apparatus, which is included in the first structure, for driving the wire, and moving the movable rotating guide pulley to change the distance to the first and second rotating guide pulleys by driving the wire,
wherein the second structure is rotated about the revolute joint by driving the first drive apparatus without changing the distance from the movable rotating guide pulley to the first and second rotating guide pulleys.

6. A joint structure comprising:
a first structure;
a second structure;
a revolute joint for connecting the first structure and the second structure;
a third rotating guide pulley which is coaxial with a rotating shaft of the revolute joint, and arranged so as to be rotatable about the rotating shaft;
a fourth rotating guide pulley which is arranged in the second structure while freely rotated;
a movable rotating guide pulley which is arranged in the second structure so as to be relatively movable;
a first drive apparatus, which is included in the first structure, for rotating the second structure about the revolute joint without changing a distance from the movable rotating guide pulley to the rotating guide pulley; and
a second drive apparatus, which is included in the first structure, for driving a wire, and moving the movable rotating guide pulley to change the distance to the rotating guide pulley by driving the wire; and
the wire which is put round the third rotating guide pulley, the movable rotating guide pulley, and the fourth rotating guide pulley in an order of the third rotating guide pulley, the movable rotating guide pulley, and the fourth rotating guide pulley, one end portion of the wire being fixed to the second drive apparatus, the other end portion being fixed to the fourth rotating guide pulley;
a first parallel link whose one end portion is supported by the first structure while freely rotated; and
a second parallel link in which one end portion is connected to the other end portion of the first parallel link so as to be freely rotated and the other end portion is fixed to the fourth rotating guide pulley,
wherein a four-node parallel link structure is formed so as to have four fulcrums of a portion where the one end portion of the first parallel link is supported to the first structure, a portion where the other end portion of the first parallel link and the one end portion of the second parallel link are connected to each other, a portion where the other end portion of the second parallel link is fixed to the fourth rotating guide pulley, and a portion which is arranged in the second structure of the fourth rotating guide pulley while freely rotated, and
the second structure is rotated about the revolute joint by driving the first drive apparatus without changing the distance from the movable rotating guide pulley to the third rotating guide pulley.

7. A joint structure comprising:
a first structure;
a second structure;
a rotating guide pulley which is coaxial with a rotating shaft of the revolute joint, and arranged so as to be rotatable about the rotating shaft;
a movable rotating guide pulley which is arranged in the second structure so as to be relatively movable;
a first drive apparatus which is included in the first structure, for rotating the second structure about the revolute joint without changing a distance from the movable rotating guide pulley to the rotating guide pulley;
a second drive apparatus which is included in the first structure, for driving a wire, and moving the movable rotating guide pulley to change the distance to the rotating guide pulley by driving the wire;
the wire which is put round the rotating guide pulley and the movable rotating guide pulley in an order of the rotating guide pulley and the movable rotating guide pulley, one end portion of the wire being fixed to the second drive apparatus, the other end portion being fixed to the movable rotating guide pulley;
a first parallel link whose one end portion is supported by the first structure while freely rotated; and
a second parallel link in which one end portion is connected to the other end portion of the first parallel link while being freely slidable and rotatable and the other end portion is fixed to the movable rotating guide pulley, wherein a four-node parallel link structure is formed while having four fulcrums of a portion where the one end portion of the first parallel link is supported to the first structure, a portion where the other end portion of the first parallel link and the one end portion of the second parallel link are connected to each other, a portion where the other end portion of the second parallel link is fixed to the movable rotating guide pulley, and a portion which is arranged in the second structure of the rotating guide pulley while freely rotated, and the second structure is rotated about the revolute joint by driving the first drive apparatus without changing the distance from the movable rotating guide pulley to the rotating guide pulley.

8. A robot arm comprising:

a joint structure as in claim 1;

a hand which is arranged at an front end on a side opposite to a revolute joint side of the second structure; and a hand driving wire for connecting the movable rotating guide pulley and the hand, wherein the movable rotating guide pulley is movable relative to the second structure, and thereby the hand driving wire rotates and drives the hand with respect to the second structure.

9. A robot arm comprising:

a joint structure as in claim 2;

a hand which is arranged at an front end on a side opposite to a revolute joint side of the second structure; and a hand driving wire for connecting the movable rotating guide pulley and the hand, wherein the movable rotating guide pulley is movable relative to the second structure, and thereby the hand driving wire rotates and drives the hand with respect to the second structure.

10. A robot arm comprising:

a joint structure as in claim 3;

a hand which is arranged at an front end on a side opposite to a revolute joint side of the second structure; and a hand driving wire for connecting the movable rotating guide pulley and the hand, wherein the movable rotating guide pulley is movable relative to the second structure, and thereby the hand driving wire rotates and drives the hand with respect to the second structure.

11. A robot arm comprising:

a joint structure as in claim 4;

a hand which is arranged at an front end on a side opposite to a revolute joint side of the second structure; and a hand driving wire for connecting the movable rotating guide pulley and the hand, wherein the movable rotating guide pulley is movable relative to the second structure, and thereby the hand driving wire rotates and drives the hand with respect to the second structure.

12. A robot arm comprising:

a joint structure as in claim 5;

a hand which is arranged at an front end on a side opposite to a revolute joint side of the second structure; and a hand driving wire for connecting the movable rotating guide pulley and the hand, wherein the movable rotating guide pulley is movable relative to the second structure, and thereby the hand driving wire rotates and drives the hand with respect to the second structure.

13. A robot arm comprising:

a joint structure as in claim 6;

a hand which is arranged at an front end on a side opposite to a revolute joint side of the second structure; and a hand driving wire for connecting the movable rotating guide pulley and the hand, wherein the movable rotating guide pulley is movable relative to the second structure, and thereby the hand driving wire rotates and drives the hand with respect to the second structure.

14. A robot arm comprising:

a joint structure as in claim 7;

a hand which is arranged at an front end on a side opposite to a revolute joint side of the second structure; and a hand driving wire for connecting the movable rotating guide pulley and the hand, wherein the movable rotating guide pulley is movable relative to the second structure, and thereby the hand driving wire rotates and drives the hand with respect to the second structure.

\* \* \* \* \*